(12) United States Patent
Rimer et al.

(10) Patent No.: US 7,200,608 B2
(45) Date of Patent: Apr. 3, 2007

(54) APPLICATION PROGRAMMING INTERFACE FOR CENTRALIZED STORAGE OF PRINCIPAL DATA

(75) Inventors: Matthew Rimer, Redmond, WA (US); Andy Harjanto, Sammamish, WA (US); Kim Cameron, Bellevue, WA (US); Don Hacherl, North Bend, WA (US); Murli Satagopan, Sammamish, WA (US); Nitin Karmarkar, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 10/693,097

(22) Filed: Oct. 23, 2003

(65) Prior Publication Data

US 2005/0091265 A1    Apr. 28, 2005

(51) Int. Cl.
G06F 17/00 (2006.01)
G06F 15/173 (2006.01)

(52) U.S. Cl. .................. 707/102; 707/101; 707/103 R; 707/104.1; 709/224

(58) Field of Classification Search ................ 707/102, 707/203, 205, 101, 103 R, 104.1; 709/224; 711/216; 717/218, 106, 116, 118
See application file for complete search history.

(56) References Cited

U.S. PATENT DOCUMENTS

| | | | | |
|---|---|---|---|---|
| 5,542,078 A | * | 7/1996 | Martel et al. ................ | 707/101 |
| 5,634,052 A | * | 5/1997 | Morris ............................ | 707/1 |
| 5,778,395 A | * | 7/1998 | Whiting et al. .............. | 707/204 |
| 5,832,498 A | * | 11/1998 | Exertier .................. | 707/103 R |
| 6,237,035 B1 | * | 5/2001 | Himmel et al. ............. | 709/224 |
| 6,292,880 B1 | * | 9/2001 | Mattis et al. ................ | 711/216 |
| 2002/0042716 A1 | * | 4/2002 | Carroll et al. .................. | 705/1 |
| 2002/0114522 A1 | * | 8/2002 | Seeber ........................ | 382/218 |
| 2003/0236859 A1 | * | 12/2003 | Vaschillo et al. ............ | 709/218 |
| 2004/0019874 A1 | * | 1/2004 | Edwards et al. ............. | 717/106 |
| 2004/0044837 A1 | * | 3/2004 | Hasbun et al. .............. | 711/103 |
| 2004/0078782 A1 | * | 4/2004 | Clement et al. ............ | 717/116 |
| 2004/0093587 A1 | * | 5/2004 | Sesma ......................... | 717/118 |

OTHER PUBLICATIONS

Advanced Communications and Multimedia Security—Automatic Authentication Based on the Austrian Citizen Card, *A Reference Implementation*, by Arno Hollosi, Udo Payer, and Reinhard Posch, pp. 241-253.

(Continued)

*Primary Examiner*—Thuy N. Pardo
(74) *Attorney, Agent, or Firm*—Merchant & Gould P.C.

(57) ABSTRACT

In the present invention, data relating to principals known to a computer system is centrally stored and objects having a standardized principal application programming interface (API) for finding, managing and accessing that data is provided to applications in lieu of having the applications independently store the principal data. The present invention eliminates the need for each application to create duplicate principal data. It also ensures that principal data are consistent throughout the applications on the computer system. In addition, the present invention allows any application with objects having the principal API to manage and change the principal data making such principal data easy to update. The principal API includes methods to find principals based on an identity reference to a principal or an identity claim that uniquely identifies the principal on computer system.

21 Claims, 5 Drawing Sheets

OTHER PUBLICATIONS

Dec. 2000, Computer—A National-Scale Authentication Infrastructure, by Randy Butler, Von Welch, Douglas Engert, Ian Foster, Steven Tuecke, John Volmer and Carl Kesselman, pp. 60-66.

Apr. 2002, DCW 2002 (2002:Sydney, N.S.W.): Distributed communities on the Web: 4th International Workshop—PIÑAS: Supporting a Community of Co-authors on the Web, by John Plaice, Peter G. Kropf, Peter Schulthess and Jacob Slonim (Eds.), pp. 113-124.

* cited by examiner

APPLICATION PROGRAMMING INTERFACE FOR CENTRALIZED STORAGE OF PRINCIPAL DATA

TECHNICAL FIELD

The present invention relates to application programming interfaces and, more particularly, to methods of an application programming interface related to centrally storing and managing principal data on a computer system.

BACKGROUND OF THE INVENTION

Current computing systems typically include computer hardware upon which is installed an operating system (OS) and one or more disparate software applications, such as word processor applications, spreadsheet applications, electronic mail applications, graphics applications, drawing applications, etc. Typically, each application stores, manages and accesses data related to that application separately. This is referred to as data duplication. Data duplication occurs even if the same information is already stored or maintained elsewhere on the computer system by another application. Often, this is because the disparate applications are separate and distinct from each other and use different data formats.

Data duplication is very common for data related to principals, e.g., persons and entities that are actors within the computer system. For example, an electronic mail application may include a database of contact objects. Each contact object may correspond to a principal, such as a person, a computer, a corporation, a group, etc., and include one or more names, telephone numbers, e-mail addresses, social security numbers, employee numbers, student numbers, drivers license numbers, credit card numbers, physical addresses and other information for the principal. In addition, word processor, spreadsheet and graphics applications may include an author field with every document they create that includes information about the principal creating the document. Such author information typically includes some or all of the information found in a contact object.

Principal data duplication is also common within the OS. The OS may maintain a Local Account that uses a userName as its identity. A Globally Unique Identifier (GUID), in addition to the distinguished name and a Security Identifier (SID), could be used as an identity in an Active Directory. At the application programming interface (API) level, one may use a Security Account Manager (SAM) or Net API to retrieve SAM's userName, while a Directory Access API could be used to retrieve GUIDs and SIDs. In addition to this, the LookupAccountName method in the API could be used to search for a SID. The formats for each of these data elements may not be standardized. In addition, each of these data elements, e.g., a GUID, a SID, a UserName, etc. used y the OS may be stored separately, even though they all relate to the same principal.

This duplication of principal data throughout the computer system is clearly an inefficient use f limited memory resources. It also potentially makes the documents created by applications larger. An even greater problem is that the duplication of principal data increases the probability that some of the data will be out of date and incorrect. Yet another drawback is that it is difficult, if not impossible, for an application to associate disparate principal data stored in different locations (such as GUIDs, SIDS, e-mail addresses, etc.) and different formats with a given principal.

Such data duplication, however, has been necessary because each application has used its own proprietary methods and formats for storing, managing and accessing principal data. In addition, different applications have different methods for accepting and updating principal data that could make the data inappropriate for use by other applications. Therefore, sharing of data between disparate applications is not possible without prior knowledge of where, how and in what format another application stores its data.

SUMMARY OF THE INVENTION

In accordance with the present invention, the above and other problems are solved by centrally storing principal data and providing a standardized principal application programming interface (API) for finding, managing and accessing that data in a consistent and standardized manner. Any application that requires principal data can be given access to the central database(s) of principal data via extending the application to call (i.e., use) a principal API built into and exposed the operating system or otherwise provided centrally.

The present invention eliminates the need for each application to create duplicate principal data. It also ensures that principal data are consistent throughout the applications. In addition, the present invention allows any application with the principal API to manage and change the principal data making such principal data easy to update. Another benefit of the present invention is that all of the principal data are potentially available from any application, supporting easy identification of principals from a single application.

In accordance with some aspects, the present invention relates to a standardized principal API that includes a standardized set of methods for accessing and manipulating principal data. One set of methods are "findbyidentity" methods including a findbyidentity method that when invoked with a property from the object searches the computer system for principal data uniquely identified by the property, instantiates a principal object containing the principal data identified by the property, and returns a pointer to the principal object. A second findbyidentity method, when invoked with a property from the object and an identifier identifying a data store on the computer system, searches the data store for principal data uniquely identified by the property, instantiates a principal object containing the principal data identified by the property, and returns a pointer to the principal object. A third findbyidentity method searches the data store for principal data uniquely identified by the value and a default scheme, instantiates a principal object containing the principal data identified by the value and the default scheme, and returns a pointer to the principal object. A fourth findbyidentity method finds a principal when given an identity reference. The method searches the computer system, instantiates one or more principal objects containing the identity claim corresponding to the identity reference, and returns a pointer to the principal object or, in the event that multiple objects are identified, an exception is thrown (that is, an error is signaled to the application which called into the principal API).

In accordance with still other aspects, the present invention relates to a method in a computer system for identifying a principal associated with a first object. The method includes maintaining in the first object identity information identifying the principal. The first object includes an API with a findbyidentity method that is invoked with the identity information as an argument. Under control of the findbyidentity method, a principal data store is searched for a principal identified by the identity information. If the search finds such a principal, a principal object is instantiated for the principal having the principal data identified by the identifying information. A pointer to the principal object is then returned to the first object giving the first object access to the principal object.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
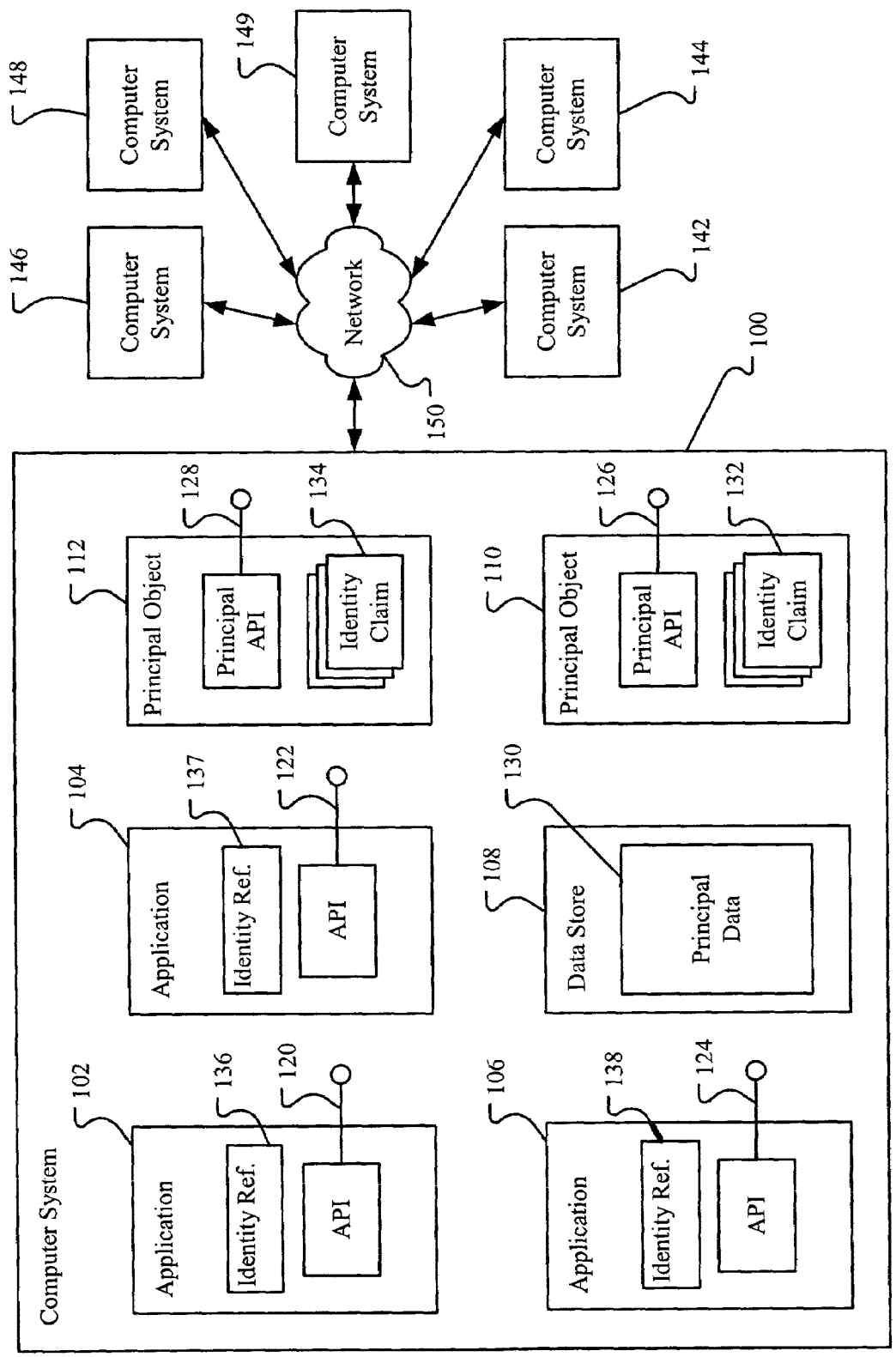
FIG. 1 is a high-level, conceptual illustration of a network of computer systems having objects having Principal APIs in accordance with an embodiment of the present invention.

The following discussion is framed with reference to the object-oriented technique of developing software and, more specifically, to the Microsoft NET Framework approach, which is a specific technology for writing object-oriented code. While embodiments of the present invention are described below as they are implemented using the NET approach, one skilled in the art will understand that these embodiments may also be implemented with other technologies for writing object-oriented code.

In object-oriented programming, software applications are made up of discrete component objects, referred to simply as objects. Each object can be considered a discrete mini-application. Objects may include data (often referred to as data members or properties) and may also be capable of performing one or more functions (referred to as the function members or methods of the object). Normally the only way to interact with objects is via one or more application programming interfaces (APIs) of the object. The APIs are said to expose the properties and methods (data and function members) of the object. Objects may enclose other objects, that is, the enclosed object may expose its API only to the enclosing object and not to other objects on the computer system.

Objects that expose the same API are said to be of the same class. In addition, the API of an object may be extended to include additional API properties or methods to increase the capabilities of the object beyond that of its base class.

Objects are said to be instantiated when they are loaded into memory, i.e. running, and their properties and methods are available to other objects. This terminology is useful in distinguishing between an object and the raw data in a data store that must be read into memory to instantiate the object.

Embodiments of the present invention use an Identity System that aggregates principal data, as well as many other types of data, in a central store, sometimes referred to as the "WinFS" store. The WinFS store is available to the various applications and objects on the computer system that can call the WinFS APIs. One of the APIs exposed by the WinFS is the Principal API. Thus, the applications and objects on the computer system have a standardized means for accessing the principal data as long as those applications and objects are extended to call the Principal API. This relieves the applications from having to independently store and maintain principal data. The Principal API provides the methods necessary to access and utilize the principal data in the WinFS store.

The Identity System is supported by two fundamental and underlying concepts: the concept of a principal; and the concept of an Identity that can be described by identity claims and identity references.

The concept of a principal as an actor in the digital world was briefly introduced above. Connected computing is a world where processes, programs and devices act in concert with each other to provide services to individuals or groups of people, such as households, organizations, and people in common roles. Such entities, that can "act" or take action in the digital world, are called principals.

The types of principals in the Identity System include:
People and households
Groups and roles
Organizations
Web and operating system services
Programs and processes
Devices and computers In the Identity System all principal types act in the same way. Having a consistent behavior makes it easier to understand, manage, and program identity and identity recognition.

The second concept of the Identity System is that of an Identity. Since principals interact with one another in the computing world, they all need to have identities that provide the ability to distinguish and recognize each other. An identity claim, stored as a property of a principal, is information that uniquely identifies that principal within a given identification system. One or more identity claims, therefore, establish an identity for a principal. For example, an e-mail address for a person can serve as an identity claim if it uniquely identifies that person in the electronic mail system. Similarly, a telephone number can serve as an identity claim for a household if it uniquely identifies that household in a PSTN telephone network. In order to extend recognition out of a single system, it is necessary to push the identity claim to others for recognition. For example, given John Doe as a principal, in order to recognize, and uniquely identify John Doe, we can issue an email identity claim. That identity claim provides a unique representation of John Doe that can now be recognized by others and used by others to distinguish this John Doe from other John Does that may be encountered in the connected computing world. An identity claim provides the basis for the ability to distinguish principals on any computer system with knowledge of the identity claim. Note that, in one embodiment, identity claims consist of two parts, a value (referred to as a urnValue) and its type (a urnScheme), e.g., john@doe.com and email, or 303-555-3423 and PSTN telephone number. In addition, identity claims also include a start time/date and an end time/date that denote a "window" during which the identity claim uniquely identifies that principal (e.g., in the case of a telephone number, the start date would be the first date on which that telephone number was assigned to you by the phone company, and the end date, if set, would denote the last day you had that telephone number).

Principals may have more than one identity claim. And, in addition to identity claims, principals may include various properties that are not unique but still serve to identify the principal. In the John Doe example, the name John Doe may be a property of the principal object. Other examples of properties are email addresses for a group email box, an organization name, an employee or registration number, and a shared or household telephone number or physical address.

Related to identity claims, is the concept of an identity reference. Whereas an identity claim is a way to uniquely "tag" a principal with a specific identity, an identity reference is a way to refer to that principal (uniquely, out of every other principal in the system), by means of that tag. Identity references can be considered "pointers" to or identifiers of a corresponding identity claim. For example, a Person (which is a principal object) might contain an identity claim for the email address "jsmith@fabrikam.com". A Document object (which is not a principal) might contain an "author" field, which in turn contains an identity reference for "jsmith@fabrikam.com". That identity reference indicates the author of the document is the principal which contains the matching identity claim, i.e., the Person. A principal object might contain an identity reference, but only as a pointer to another principal (for example, a Person might contain a "manager" field which holds an identity reference to that person's manager). Through identity references, applications and objects on the computer system can identify principals on the computer system.

It should be noted that although identity references uniquely identify an identity claim, there may be multiple instances of the same identity reference (all pointing to the same, unique identity claim) on the system, e.g., multiple documents, each of which has the same author. For more information on the Identity System, identity claims and identity references, see U.S. patent application Ser. No. 10/693,021 for IDENTITY SYSTEM FOR USE IN A COMPUTING ENVIRONMENT, which is commonly assigned to the assignee of interest in this application and which was filed on Oct. 23, 2003, the specification of which is incorporated by reference into this application.

In the Identity System, each instantiated principal exists as a principal object that encloses one or more identity claim objects. In addition, each principal object may also include one or more properties or additional objects depending on the principal. The principal objects may be further subdivided into different classes such as a contact class, a group class, a household class, an organization class, and a computer class. The different classes may contain different information or other attributes tailored to their purpose as will be discussed in greater detail below.

Regardless of how principals are implemented, the Principal API refers to the methods and properties of an API that are associated with principals. In embodiments of the present invention, objects that relate to principals are extended to call the Principal API.

For example, an address book application will have one or more objects that include identity references and can call the Principal API, through which the application can access principal data in the WinFS store such as telephone number, name, mailing address, etc. An email application will likewise have one or more objects that can call the Princiapl API through which they can access principal data. Furthermore, various operating system (OS) applications, such as security and user verification objects, will access principal data such as security identifiers (SIDs) and Globally Unique Identifiers (GUIDs), usernames, passwords, etc., through some object that can call the Principal API to access the principal data stored in the WinFS store.

In addition to component objects of the applications and OS, the principal objects, because they are part of the WinFS system, are provided with the Principal API. Take, for example, a Group class principal object. The group object, because it is a principal object will include an identity claim object that uniquely identifies the group object. In addition, the group will have members and therefore the group object is related to other principal objects. In order to access the other principal objects, the group object must also be able to call the Principal API. As any class of principal object may ultimately be related to another principal object, such as a group member, household member, employee, manager, or some other relationship, all principal objects able to call the Principal API$_{[AH1]}$.

FIG. 1 is a high-level, conceptual illustration of a network of computer systems having objects having Principal APIs in accordance with an embodiment of the present invention. In the embodiment shown, a distributed computing system is shown comprising multiple, individual computer systems 100, 140, 142, 144, 146, 148, 149 connected by a network 150. A detailed illustration of the elements in one computer system 100 is shown. The computer system 100 includes applications 102, 104, 106. While shown in FIG. 1 as comprising a single object, these applications may be comprised of one or more component objects. The applications 102, 104, 106 include at least one identity reference property 136, 137, 138 and are provided with APIs 120, 122, 124 that can call the Principal API in accordance with an embodiment of the present invention. The component objects may or may not be enclosed by other component objects of the applications.

In addition, instantiated principal objects 110, 112 are shown, each having Principal APIs 126, 128, and a plurality of identity claim objects 132, 134. For simplicity, the Principal APIs of the identity claim objects 132, 134 are not illustrated, although it will be understood that each will expose their own Principal API. Identity claim objects may or may not be enclosed in their principal objects, depending on the implementation.

A data store 108 is also shown as part of the computer system 100. The data store 108 contains data including principal data 130. The principal data 130 includes data that must be read into memory to instantiate principal objects, including the principal data for the two instantiated principal objects 110, 112 shown.

Figure 2:
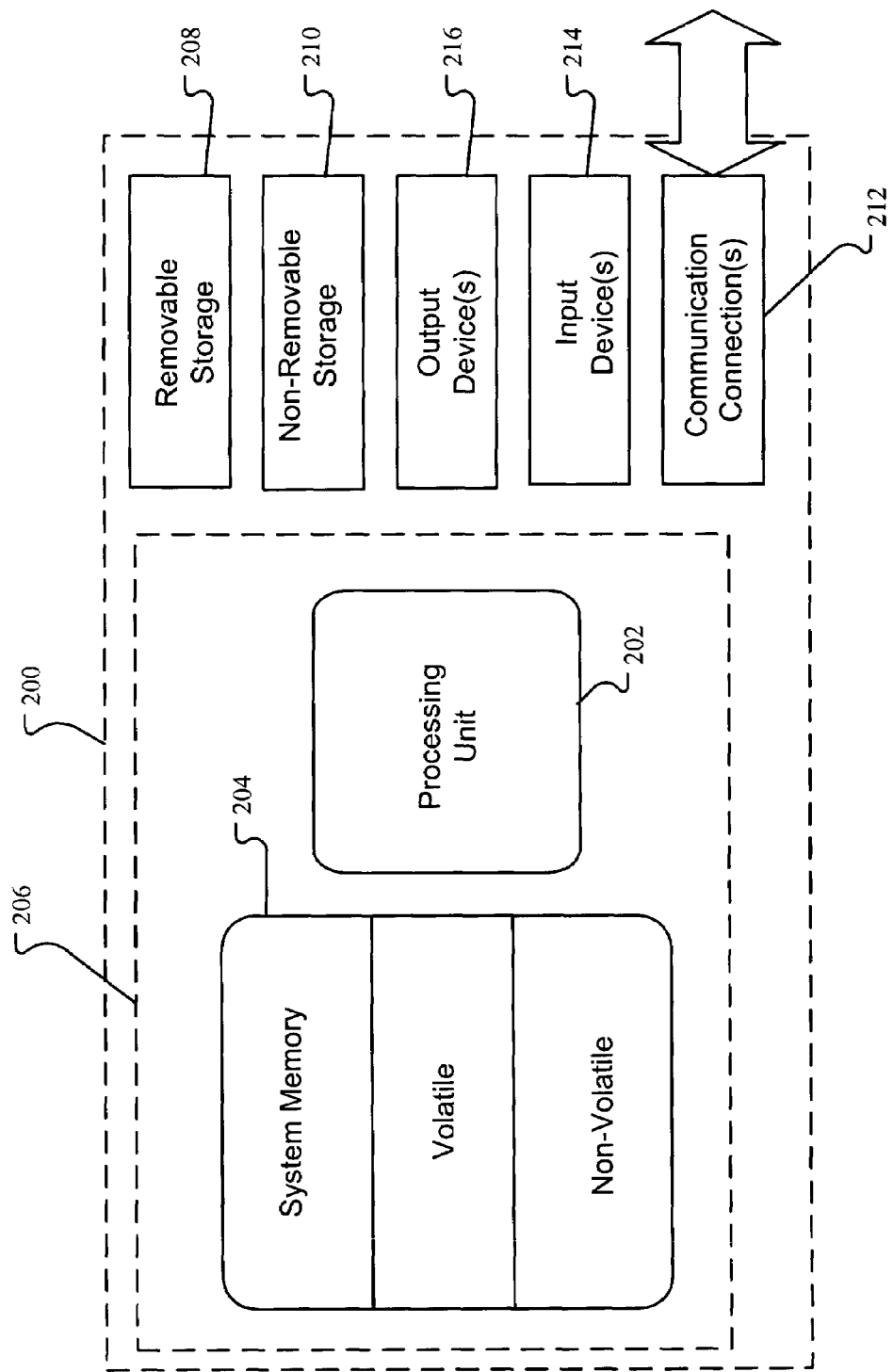
FIG. 2 illustrates an example of a suitable computing system environment on which embodiments of the present invention may be implemented.

FIG. 2 illustrates an example of a suitable computing system environment on which embodiments of the invention may be implemented. In its most basic configuration, system 200 typically includes at least one processing unit 202 and at least some form of computer readable media such as memory 204. Computer readable media can be any available media that can be accessed by the system 200. By way of example, and not limitation, computer-readable media might comprise computer storage media and communication media. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

System 200 may also have additional features/functionality. For example, system 200 may also include additional computer readable storage media as illustrated in FIG. 2 by removable storage 208 and non-removable storage 210. Again, the additional storage media may include volatile and nonvolatile media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

The logical operations of the various embodiments of methods of the present invention discussed below are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
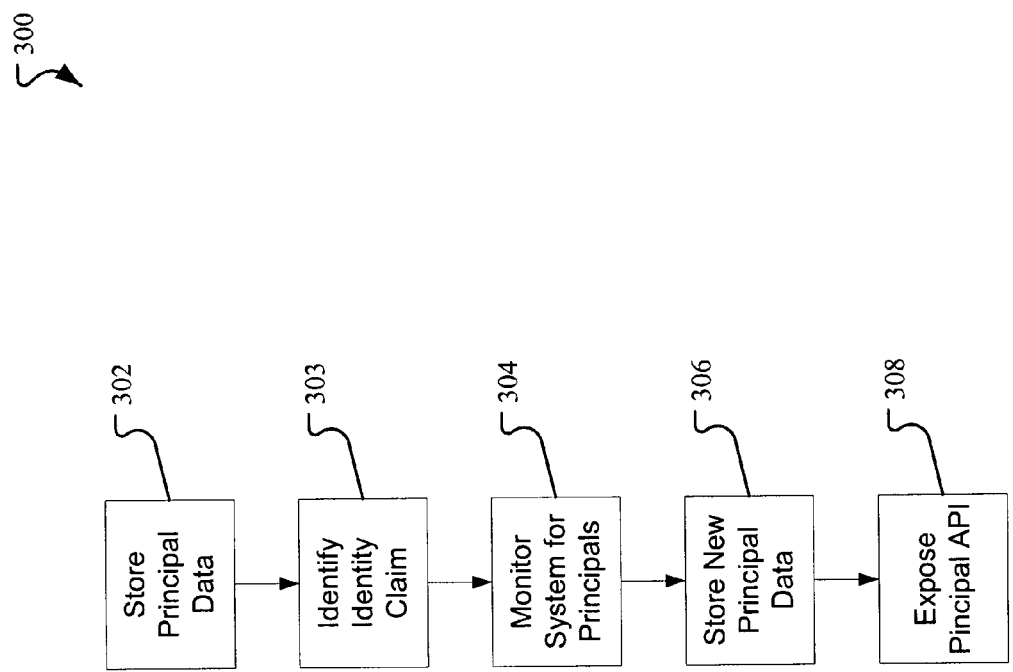
FIG. 3 illustrates an operational flow associated with managing principal data in a computer system in accordance with the present invention.

FIG. 3 illustrates an operational flow associated with managing principal data in a computer system in accordance with the present invention. As discussed above, the computer system has installed thereon a plurality of disparate applications that utilize principal data. The operations performed by the computer system include a principal data storage operation 302 that stores in a WinFS store principal data for a plurality of principals.

The principal data is maintained in a predetermined format allowing the principal data to be easily searched. The principal data includes identifying for each principal at least one identity claim in an identity claim identification operation 303. As discussed above, in embodiments the identity claim is stored in its own object and may take the form of a value and a scheme. Each principal's data may also include a class identifier that identifies the class to which the principal belongs. In addition, each principal's data may include one or more additional properties and identity reference objects, which like the identity claim may also be include of a value and a scheme.

In addition to storing principal data, the computer system may be continuously collecting new principal data and updating existing principal data stored in the WinFS store. This is illustrated by a monitoring operation 304 that monitors the computer system including the applications and OS. If as part of the monitoring operation 304, as new principal data or the existence of a new principals are identified, a store new principal data operation 306 stores the new principal data in the WinFS data store. In this way, the computer system continuously updates the WinFS store to include the principal data of every principal the computer system has knowledge of, that is, every principal that is encountered by applications having the Principal API.

It should be noted here that in some instances an application may encounter a principal but not have any more than a single identity reference for that principal. For example, an email may be received by an email application wherein the only information known by the application about the principal that sent the email is the email address. In these instances, that principal data, although incomplete, is stored in the WinFS store in the storing operation 306 as a new principal with an identity claim of the email address. As additional information is later received, such as via an identity card for the user, via other applications that encounter the same identity claim with more information, or by the creation of a contact by the email application user wherein a name, address, organization and telephone number are entered into a contacts list and associated with the email address identity claim, the initial principal created by the storing operation 306 is updated to include the new principal data entered into the contact list and associated with the email address. In this way, principal data is continuously received, updated and accessible to all applications having a Principal API.

The operations also include exposing a Principal API to all applications that need to access the principal data in the WinFS store in an expose API operation 308. As the Principal API is standardized to interface in a known and consistent way with the principal data and the WinFS store, the fact that disparate applications are accessing the same principal data for different purposes, and potentially updating or changing the principal data in the process, will not inhibit the use of the principal data by other applications.

The Principal API will contain one or more methods for accessing, retrieving and storing the principal data. Each Principal API, regardless of the object or application it is for, will contain some fundamental methods for accessing the principal data. In addition, depending on the object, some unique methods, referred to as helper methods, may also be included as a part of the object's Principal API. For example, a principal object of the group class, i.e. a Group object, may include some methods as a part of its Principal API that relate to finding, adding and deleting group members. Such methods may not be included in the Principal API of other principal objects or of component objects of applications.

The actual methods and properties that may be included in Principal APIs for various objects are discussed in greater detail below.

Figure 4:
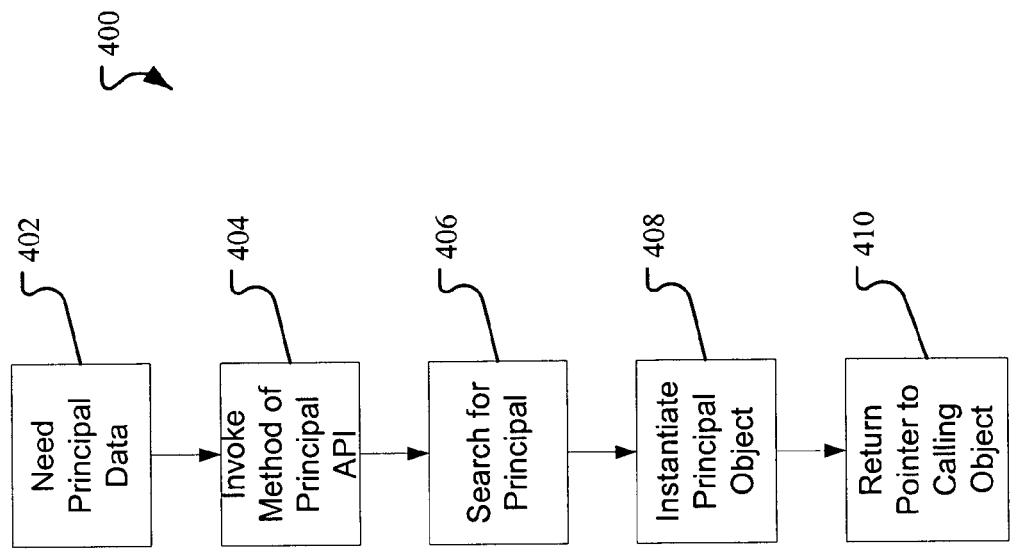
FIG. 4 illustrates one embodiment of an operational flow associated with identifying a principal using a Principal API.

FIG. 4 illustrates one embodiment of an operational flow associated with identifying a principal using a Principal API of a component object. As described above, the computer system includes a central store of principal data including at least one identity claim for each principal. The object with the Principal API must maintain some principal data that can be used to identify a principal from the principal data in the WinFS store.

In order to help the reader understand the flow 400, an example of an email message will be discussed. The exemplary email message will include a component object with an API that can call the Principal API to access and interact with the principal data in the WinFS store. In addition to the ability to call the Principal API, the component object maintains at least some principal data as a property or properties of the object. Such data may include the email addresses of the sending and receiving principals, and may include other principal data as well. In this example, the component object has the email address of the principal, which also happens to be the identity claim of the principal. Note that the identity information in this case is an identity reference of the principal.

The flow 400 starts with a determination operation 402 when an object provided with a Principal API determines that it needs to identify or otherwise access the principal data for a given principal. In the email message example, this may occur when a user viewing the email message gives a command, such as to view the sending principal's contact information or to create a contact for the sending principal, that requires additional principal data related to a specified principal. In addition, such a determination may be made without user input such as automatically upon receipt of an email. This automatic determination may be part of a continuous monitoring operation, such as the one described above, wherein each incoming email is screened by the computer system to determine if it contains reference to a previously unknown principal or contains updated or additional data for an existing principal.

As part of the determination operation 402, some principal information, such as the email address, must be identified by the object that will subsequently be used to search for and identify the principal. As mentioned above, this address is maintained as a property of the object.

After the determination operation 402, an invoking operation 404 invokes a findbyidentity method of the Principal API. As part of the invoking operation 404, the identity information of the principal, in the example the identity reference of the email address, is passed as an argument of the findbyidentity method.

Different embodiments of the findbyidentity methods may require additional arguments to be passed, such as a store identifier (referred to as an ItemContext in the method discussions below) that identifies what data store to search for the principal. Another argument that may be passed, is a type identifier (referred to as System.Type below) that directs the findbyidentity method to search for only principals of specific type or class.

As a result of the invoking operation 404, the findbyidentity method then performs several operations 406, 408, 410. First, the findbyidentity method performs a searching operation 406 that searches the principal data for a principal with identity information matching the identity information passed to the findbyidentity in the invoking operation 404. A match is determined if a principal includes an identity claim that matches the identity information passed. As mentioned above, depending on the embodiment of the findbyidentity method and the arguments passed, the search may also be limited to search a specific store and to search for principals of a specified type.

If the searching operation 406 identifies a principal that has the passed identity information, then an instantiation operation 408 instantiates a principal object for the principal having the passed identity reference. If the searching operation 406 identifies multiple principals having the passed identity information, then instantiation operation 408 may instantiate all identified principals or a collection object that contains identity references to each of the identified principals, or it may return an exception.

Finally, a pointer to the instantiated principal object is then returned to the instantiating object in a return pointer operation 410. At this point, the instantiating object has access to all the principal data related to the principal via the returned pointer.

With reference to the email message example, the email address of the selected principal may be passed as an identity reference to the findbyidentity method in the invoking operation 404. Then searching operation 406 searches the principal data for a principal with a matching identity claim, in this case the email address. If a principal with an identity claim having a matching email address is found, instantiation operation 408 instantiates a principal object for the principal. A pointer is returned to the email message object in the return pointer operation 410, through which the email message now has access to the principal's data.

Object Classes Using the Principal API

In embodiments of the present invention, there are two broad groups of classes of objects that expose the Principal API. These are the identity classes (IdentityReference and IdentityClaim) and the actor classes (Person, Group, Household and Organization). These groups of classes are linked together via the Principal class. The Principal class is an extension class. That is: it is 'attached' to an object to extend that object's functionality, but it is not embedded in the object class nor does it derive from the class. This allows multiple extensions to be attached to a single object to extend its functionality in multiple different ways.

The Principal class is used to extend one of the classes derived from Contact (Person, Group, Household or Organization), the Contact class itself or the Computer class.

The IdentityClaim classes are used to 'claim' an identity. They are authoritative instances of an identity for a given principal. Each principal has a collection of one or more identity claim objects that are used to identify the principal. When an identity claim object is associated with a principal, the identity claim is signed so that the relationship can be verified as authoritative later.

The IdentityReference class is used as a reference to an instance of an IdentityClaim. It does not have the stringent requirements that an IdentityClaim has as it is not authoritative, indicating a relationship between a particular identifier (SID, GUID etc.) and a specific Principal. The classes derived from either IdentityClaim and IdentityReference are behavioral only. They do not add more persistent storage, they only implement helper functions to help access and manipulate the data stored internally.

Fundamental Principal API Properties and Methods

As discussed briefly above, each Principal API regardless of the object it is provided for, will include certain fundamental methods. The following is a brief description of embodiments of some of these fundamental Principal API methods presented as implemented in a C# syntax. However, the Principal API is not limited to C#, but can be implemented via other languages as well.

The reader will note that many of details presented below are specific to one possible implementation of the API. For example, the details of the exact search filter constructed are particular to the implementation of the underlying WinFS store. In addition, OpenThreadToken is a specific Win32 function call. The descriptions below should be considered exemplary embodiments of some of the possible functions of the Principal API$_{[AH2]}$.

Public and Protected Interface partial public class <class>: System.Storage.Base.Extension

```
{
    static <class> FindByIdentity(ItemContext itemContext,
        System.Type type, string urnValue);
    static <class> FindByIdentity(ItemContext itemContext,
        string urnValue);
    static <class> FindByIdentity(ItemContext itemContext,
        IdentityReference id);
    new string ToString( );
    static <class> GetCurrent(ItemContext itemContext);
    static <class> GetCurrent( );
}
```

Properties and Methods static <class> FindByIdentity(ItemContext itemContext, System.Type type, string urnValue)

FindByIdentity searches the specified ItemContext for an object of the type <class> that is associated with an identity claim of the specified type type with a urnValue that matches urnValue. If type is not a class derived from IdentityReference or IdentityClaim then an InvalidArgument exception is thrown. The search will only be performed for the type of identity passed in. If no object is found a ItemNotFoundException exception is thrown. If multiple objects are returned then an MultipleObjectsFoundException exception is thrown.

The search is performed on the ItemContext (i.e. in the store identified by itemContext) using the FindByIdentity method that takes a filter and a type. The filter constructed depends upon the urnScheme of the type passed in. The filter takes the form of 'Principal.m_identityClaim.urnScheme='urnScheme' AND Principal.m_identityClaim.urnValue=urnValue' (where urnScheme is the urnScheme property of the type passed in). The type of object that is searched for is defined by <class>.

static <class> FindByIdentity(ItemContext itemContext, string urnValue)

FindByIdentity searches the specified ItemContext for objects that are associated with an identity claim of a default type with an identity claim with a urnValue that matches urnValue. In an alternative embodiment, the search is performed across all types of IdentityClaim. If no object is found an ItemNotFoundException exception is thrown. If multiple objects are returned then a MultipleObjectsFound exception is thrown.

The search is performed on the ItemContext using the Find method that takes a filter and a type. The filter takes the form of 'Principal.m_identityClaim.urnValue=urnValue'. The type of object that is searched for is defined by <class>.

static <class> FindByIdentity(ItemContext itemContext, IdentityReference id)

FindByIdentity searches the specified ItemContext for objects that are associated with an identity claim that matches the IdentityReference specified by id. This method would be called by a code that has an identity reference object. Objects that contain identity information such as an email address string, would not call this method, but rather one of the other findbyidentity methods, passing the email address as a urnValue$_{[AH3]}$. The search is only performed across the type of IdentityClaim that corresponds to the IdentityReference specified by id. If no object is found a ItemNotFoundException exception is thrown. If multiple objects are returned then an MultipleObjectsFound exception is thrown.

The search is performed on the ItemContext using the Find method that takes a filter and a type. The filter constructed depends upon the IdentityReference passed in. The filter takes the form of 'Principal.m_identityClaim.urnValue=id.urnValue AND Principal.m_identityClaim.urnScheme=id.urnScheme AND Principal.m_identityClaim.StartDate <id.referenceDate and Principal.m_identityClaim.EndDate> id.referenceDate'. The type of object that is searched for is defined by <class>.

static <class> GetCurrent(ItemContext itemContext)

GetCurrent returns the <class> for the specified ItemContext that is associated with the current security context. This is done by calling OpenThreadToken and using the returned token in a call to GetTokenInformation requesting TokenUser, which returns a SID. The SID is then searched for using the <class>.FindByIdentity method, passing a SecurityIdentity initialized with the users SID.

The default behavior is to just return a ToString( ) implementation of the object.

Class-Specific Principal API Properties and Methods

The following is a brief description of embodiments of various principal object classes and some of the Principal API properties and methods that are class-specific.

Principal Class

Overview

The Principal class extends other classes that can function as 'principals' in the system. These include (but is not limited to) Persons, Groups, Households and Computers.

Public and Protected Interface partial public class Principal: System.Storage.Base.Extension

```
{
    internal protected Principal( );
    // methods
    static public Principal FindByIdentity(ItemContext itemContext,
        System.Type type, string urnValue);
    static public Principal FindByIdentity(ItemContext itemContext,
        IdentityReference id);
    static public Principal FindByIdentity(ItemContext itemContext,
        string emailUrnValue);
    static public Principal GetCurrent( );
    static public Principal GetCurrent(ItemContext ctx);
    public new override String ToString( );
    public bool IsEqual(Principal p1);
    static public overload operator==(Principal p1, Principal p2);
    public Item GetItem( );
    public void ChangePassword( string oldPassword,
        string newPassword);
    public void ChangePassword( string oldPassword,
        string newPassword,
            PasswordModifyMethod method);
    public void ResetPassword(string password);
    public void ResetPassword(string password,
```

-continued

```
        PasswordModifyMethod method);
    public enum PasswordModifyMethod
    {
        Negotiate,
        Ntml,
        Kerberos,
        Ssl,
    }
    protected IdentityClaimCollection m_identityClaims;
}
```

Properties and Methods public Principal( )

This constructor creates a default (empty) Principal.

static public Principal FindByIdentity(ItemContext itemContext, System.Type type, string urnValue)

See the Fundamental Principal API Properties and Methods discussion.

static public Principal FindByIdentity(ItemContext itemContext, IdentityReference id)

See the Fundamental Principal API Properties and Methods discussion.

static public Principal FindByIdentity(ItemContext itemContext, string urnValue)

See the Fundamental Principal API Properties and Methods discussion.

static public Principal GetCurrent( )

See the Fundamental Principal API Properties and Methods discussion.

static public Principal GetCurrent(ItemContext ctx)

See the Fundamental Principal API Properties and Methods discussion.

public new override String ToString( )

Calls the owning objects ToString method and returns the result to the caller.

public bool IsEqual(Principal p1)

This returns TRUE if any of the Principals IdentityClaims are equal, false otherwise.

public Item GetItem

GetItem returns the Item that the Principal class is an extension of. This is obtained by resolving the item identified by the m_OwningElementID. This is performed using ItemIDReference.Resolve which returns the item identified by m_OwningElementID.

public void ChangePassword(string oldPassword, string newPassword)

ChangePassword behaves differently depending upon ItemContext of the Principal (the domain is NULL to change the local password). The username is found by enumerating the IdentityClaims associated with this principal and retrieving the UserName property of the NT4AccountIdentityClaim of the principal. If no appropriate IdentityClaim can be found then an InvalidObjectException is thrown (because if the Principal does not have an NT4AccountIdentityClaim then it's not an account and so it can not have the password changed).

The password is updated by sending an ldap modify request with two parts: one deleting the existing password and the other adding the new password. The attribute that is modified is unicodePwd. When the old password is deleted, the existing password is passed in as the value of the delete operation. The new password is passed as the value of the add operation. (Both passwords are encased in double quotes before being added as ber values.)

If an appropriate LDAP connection cannot be obtained (i.e. an authentication mechanism was specified that the server identified by the ItemContext cannot support or no other suitable connection could be created) then the Win32 API NetUserChangePassword is used to change the password.

public void ChangePassword(string oldPassword, string newPassword, PasswordModifyMethod method)

If this method is called on a Principal associated with an Item that has an ItemContext for the local WinFS store, a SystemException is thrown.

ChangePassword behaves differently depending upon ItemContext of the Principal. If the ItemContext is for a WinFS store, then NetUserChangePassword is called to change the password, the domain is NULL to change the local password. The username is found by enumerating the IdentityClaims associated with this Principal and retrieving the UserName property of the NT4AccountIdentityClaim. If no appropriate IdentityClaim can be found then an InvalidObjectException is thrown (because if the Principal does not have an NT4AccountIdentityClaim then it's not an account and so it can not have the password changed).

If the ItemContext is for an LDAP store, then the managed LDAP API is used to find the user in the directory and then the password attribute is updated. If it is not possible to write the password using the specified PasswordModifyMethod then the password update will fail.

The user is found by enumerating the IdentityClaims associated with the Principal. When an appropriate IdentityClaim is found (LdapDnIdentityClaim or UpnIdentityClaim) an IdentityReference is obtained by using the GetIdentityReference method of IdentityClaim. If the IdentityReference is not an LdapDnIdentity then Translate is called to generate an LdapDnIdentity. The urnValue is then used as the DN in the modify operation.

The password is updated by sending an ldap modify request with two parts: one deleting the existing password and the other adding the new password. The attribute that is modified is unicodePwd. When the old password is deleted, the existing password is passed in as the value of he delete operation. The new password is passed as the value of the add operation. (Both passwords are encased in double quotes before being added as ber values.)

public void ResetPassword(string password)

ResetPassword behaves differently depending upon the ItemContext of the Principal. If the ItemContext is for a WinFS store, then the password is reset using NetUserSetInfo. The server name is NULL to change the password locally. The username is found by enumerating the IdentityClaims associated with this Principal and retrieving the UserName property of the NT4AccountIdentityClaim. If no appropriate IdentityClaim can be found then an InvalidObjectException is thrown (because if the Principal does not have an NT4AccountIdentityClaim then it's not an account and so it can not have the password changed).

If the ItemContext is for an LDAP store then the managed LDAP API is used to find the user in the directory and then the password attribute is written. If it is not possible to write the password in a secure manner, (i.e. if the LDAP connection cannot be encrypted or use 128-bit SSL) then the password update will fail.

The user is found by enumerating the IdentityClaims associated with the Principal. When an appropriate IdentityClaim is found (LdapDnIdentityClaim or UpnIdentityClaim) an IdentityReference is obtained by using the GetIdentityReference method of IdentityClaim. If the IdentityReference is not an LdapDnIdentity then Translate is called to generate an LdapDnIdentity. The urnValue is then used as the DN in the modify operation.

The password is reset by sending an ldap modify request of type 'replace', passing in the new password as the value of the replace operation. The attribute that is replaced is unicodePwd. (The password is encased in double quotes before being added as the value for the operation.).

public void ResetPassword(string password, PasswordModifyMethod method)

If this method is called on a Principal associated with an Item that has an ItemContext for the local WinFS store, a SystemException is thrown.

ResetPassword behaves differently depending upon the ItemContext of the Principal. If the ItemContext is for a WinFS store, then the password is reset using the NetUserSetInfo API, passing a USER_INFO_1003 structure with the new password in it. The server name is NULL to change the password locally. The username is found by enumerating the IdentityClaims associated with this Principal and retrieving the UserName property of the NT4AccountIdentityClaim. If no appropriate IdentityClaim can be found then an InvalidObjectException is thrown (because if the Principal does not have an NT4AccountIdentityClaim then it's not an account and so can't have the password changed). The PasswordModifyMethod parameter is ignored if the ItemContext is for a WinFS store.

If the ItemContext is for an LDAP store then the managed LDAP API is used to find the user in the directory and then the password attribute is written. If it is not possible to write the password using the PasswordModifyMethod specified then the password update will fail.

The user is found by enumerating the IdentityClaims associated with the Principal. When an appropriate IdentityClaim is found (LdapDnIdentityClaim or UpnIdentityClaim) an IdentityReference is obtained by using the GetIdentityReference method of IdentityClaim. If the IdentityReference is not an LdapDnIdentity then Translate is called to generate an LdapDnIdentity. The urnValue is then used as the DN in the modify operation.

The password is reset by sending an ldap modify request of type 'replace', passing in the new password as the value of the replace operation. The attribute that is replaced is unicodePwd. (The password is encased in double quotes before being added as the value for the operation.)

Contact Class
Overview

The Contact class is the base for most of the 'actors' involved with the Principal API. As far as the Principal API is concerned, it is just another class that the Principal class can extend.

Public and Protected Interface
partial public class Contact: System.Storage.Base.Item

```
{
    // constructor
    public Contact( IdentityClaim id);
    // methods
```

-continued

```
    static public Contact FindByIdentity(ItemContext itemContext,
        System.Type type, string
urnValue);
    static public Contact FindByIdentity(ItemContext itemContext,
        IdentityReference id);
    static public Contact FindByIdentity(ItemContext itemContext,
        string emailUrnValue);
    static public Contact GetCurrent( );
    static public Contact GetCurrent(ItemContext ctx);
    public bool IsEqual( );
    public static overload operator==(Contact p1, Contact p2);
}
```

Properties and Methods

Contact (IdentityClaim id)
This constructor creates a Contact initialized with the specified IdentityClaim.

static public Contact FindByIdentity(ItemContext itemContext, System.Type type, string urnValue)
See the Fundamental Principal API Properties and Methods discussion.

static public Contact FindByIdentity(ItemContext itemContext, IdentityReference id)
See the Fundamental Principal API Properties and Methods discussion.

static public Contact FindByIdentity(ItemContext itemContext, string urnValue)
See the Fundamental Principal API Properties and Methods discussion.

static public Contact GetCurrent( )
See the Fundamental Principal API Properties and Methods discussion.

static public Contact GetCurrent(ItemContext ctx)
See the Fundamental Principal API Properties and Methods discussion.

public bool IsEqual(Contact p1)
If both p1 and p2 are NULL then TRUE is returned. If one is null but other is non-null, false is returned. Otherwise the Principal extensions of each contact are compared to each other (return p1.Principal==p2.Principal).

public static overload operator==(Contact p1, Contact p2)
Returns p1.IsEqual(p2).

Person Class
Overview
The Person class derives from Contact and implements extra methods that are associated with a Person.
Public and Protected Interface
partial public class Person: System.Storage.Core.Contact

```
{
    public Person( IdentityClaim id);
    // Methods
    static public Person FindByIdentity(System.Type type,
    string urnValue);
    static public Person FindByIdentity(IdentityReference id);
    static public Person FindByIdentity(string emailUrnValue);
    static public Person GetCurrent( );
    static public Person GetCurrent(ItemContext ctx);
    public bool IsEqual(Person p1);
    public static overload operator==(Person p1, Person p2);
    // Direct Report
```

-continued

```
    public FindResult GetDirectReports( ); //one level
    public FindResult GetAllReports(int level);
    public void AddDirectReport(System.Type type, string urnValue);
    public void AddDirectReport(IdentityReference id);
    public void AddDirectReport(urnValue);
    public void RemoveDirectReport(System.Type type,
      string urnValue);
    public void RemoveDirectReport(IdentityReference id);
    public void RemoveDirectReport(urnValue);
    //Group : MemberOf
    public FindResult GetGroupMemberOf( );
    public FindResult GetGroupMemberOf(System.Type type);
        //note: type could be typeOf(Group) or
            typeOf(IdentityReference)
    // Properties
    public Person Manager {get; set; } // manager in a primary org
    public Organization {get; set; } // primary org
    public Household { get; set; }
    public Spouse { get; set; }
    public Principal {get; set; }
}
```

Properties and Methods public Person(IdentityClaim id)

Constructs a Person object whose Principal is initialized with the IdentityClaim id.

static public Person FindByIdentity(ItemContext itemContext, System.Type type, string urnValue)

See the Fundamental Principal API Properties and Methods discussion.

static public Person FindByIdentity(ItemContext itemContext, IdentityReference id)

See the Fundamental Principal API Properties and Methods discussion.

static public Person FindByIdentity(ItemContext itemContext, string urnValue)

See the Fundamental Principal API Properties and Methods discussion.

static public Person GetCurrent( )

See the Fundamental Principal API Properties and Methods discussion.

static public Person GetCurrent(ItemContext ctx)

See the Fundamental Principal API Properties and Methods discussion.

public bool IsEqual( )

If both p1 and p2 are NULL then TRUE is returned. If one is null, but other is non-null, false is returned. Otherwise the Principal extensions of each Person are compared to each other (return p1.Principal p2.Principal).

public overload operator==(Person p1, Person p2)

Returns p1.IsEqual(p2).

public FindResult GetDirectReports( )

GetDirectReports finds all EmployeeData objects where the Manager.Key is set to this Persons ItemIDKey. A search string is constructed from the results that returns all the objects that are the Targets of each EmployeeData object. The results of the search performed with this search string are returned to the caller.

public FindResult GetAllReports(int level)

Three ArrayLists of collections are created: FinalResults, CurrentLevel and CurrentResults.

GetDirectReports is called and the results are added to the CurrentLevel collection. Then level is decremented.

While level doesn't equal 0, each item in the CurrentLevel collection has GetDirectReports called on it. The results from each call are added to the CurrentResults collection. Once all the items in the CurrentLevel collection have been traversed, level is decremented and all the items in the CurrentLevel are moved into the FinalResults collection. All the items from the CurrentResults collection are moved into the CurrentLevel collection. Then back to the start of this paragraph. If there are no items in the CurrentResults collection or level equals 0 then the cycle is broken and we move on.

If any items exist in the CurrentLevel collection, they are moved into the FinalResults collection.

The FinalResults collection is returned to the caller. A search string is constructed that matches all of the objects that exist in the FinalResults collection. The results of a search performed with this search string are returned to the caller.

public void AddDirectReport(System.Type type, string urnValue)

AddDirectReport performs a search using Person.FindByIdentity passing in the type and urnValue. If the search succeeds and the returned item is a Person then a relationship is created between this Person and the item returned by the search. If the returned item is not a Person then an InvalidObjectException is thrown. If the search fails the exception thrown by the search is propagated to the caller.

public void AddDirectReport(IdentityReference id)

AddDirectReport performs a search using Person.FindByIdentity passing in the id. If the search succeeds and the returned item is a Person a relationship is created between this Person and the item returned by the search. If the returned item is not a Person then an InvalidObjectException is thrown. If the search fails the exception thrown by the search is propagated to the caller.

public void AddDirectReport(urnValue)

AddDirectReport performs a search using Person.FindByIdentity passing in the urnValue. If the search succeeds and the returned item is a Person a relationship is created between this Person and the item returned by the search. If the returned item is not a Person then an InvalidObjectException is thrown. If the search fails the exception thrown by the search is propagated to the caller.

public void RemoveDirectReport(System.Type type, string urnValue)

RemoveDirectReports searches for Persons that have a direct report relationship with this object and have an IdentityClaim that matches the type and urnValue specified (using Person.FindByIdentity). If a Person is not returned by the search then a NoRelationshipException is thrown. If the search fails the exception thrown by the search is propagated to the caller.

The relationship to delete is found using a RelationshipSearcher<Person, GroupMembership>, this Person is set as the target and the principal returned by the previous search is used as the source for the relationship. If no relationship is returned by the search then a NoRelationshipException is thrown. All the EmployeeData objects that represent these relationships are found and their Manager property is set to NULL to remove the relationship.

public void RemoveDirectReport(IdentityReference id)

RemoveDirectReports searches for Persons that have a direct report relationship with this object and have an IdentityClaim that matches the IdentityReference (id) specified (using Person.FindByIdentity). If no Person is returned by the search then a NoRelationshipException is thrown. If the search fails the exception thrown by the search is propagated to the caller.

public void RemoveDirectReport(urnValue)

RemoveDirectReport searches for Persons that have a direct report relationship with this object and have an IdentityClaim that matches the urnValue specified (using Person.FindByIdentity). If no Person is returned by the search then a NoRelationshipException is thrown. If the search fails the exception thrown by the search is propagated to the caller.

All the EmployeeData objects that represent these relationships are found and their Manager property is set to NULL to remove the relationship.

public FindResult GetGroupMemberOf( )

GetGroupMemberOf uses a RelationshipSearcher<Group, GroupMembership> to search for all Groups that this Person is a member of. (Member of implies a GroupMembership relationship between the item and this Person.) This Person is set as the target of the relationship. The Sources of the Relationships returned by this search are added to a FindResult collection and returned to the caller.

public FindResult GetGroupMemberOf(System.Type type)

This method returns a FindResult collection of groups that this Person is a member of. The items added to the collection depends on the argument passed in. If the type is Group then this method produces the same result as GetGroupMemberOf( ). If the type is an IdentityReference (or a class derived from IdentityReference) then the collection will hold IdentityReferences of the requested type (or derived types if IdentityReference itself is passed in) for the groups that this Person is a member of.

For instance: if EmailIdentity is passed in, then for each Group that has an EmailIdentity and that this Person is a member of, the EmailIdentity will be returned in the FindResult collection.

If type is Group then this method uses a RelationshipSearcher<Group, GroupMemberOf> to search for all Groups that this Person is a member of. This Person is set as the target of the relationship. The Sources of the Relationships returned by this search are added to a FindResult collection and returned to the caller.

If type is IdentityReference (or a derived class) then a filter is constructed to pass to the ItemContext.Find method that takes a filter and a type. The type is the type passed in. If the type is IdentityReference then the filter is of the form: 'Group.GroupMembers.Target=this.ItemID'. If type is derived from IdentityReference then the filter is of the form 'Group.GroupMembers.Target=this.ItemID AND Group.GroupMembers.Owner.IdentityClaims.UrnScheme=type.UrnScheme'.

public Person Manager {get; set;}

Getting or setting this property returns or changes the Manager member for this Person. NOTE: This is the Manager for this person in their primary Organization.

public Organization {get; set;}

Getting or setting this property returns or changes the primary Organization relationship for this Person. This is a member variable of the Person class. The relationship between the Organization and the Person must exist or an ArgumentException is thrown.

public Household {get; set;}

Getting or setting this property returns or changes the Household relationship of this Person.

public Spouse {get; set;}

Getting or setting this property returns or changes the Spouse relationship of this Person.

public Principal {get; set;}

Getting or setting this property returns or Principal associated with this Person. Note, this is a 'write-once' property. If there is already a Principal extension associated with this Person, then an InvalidOperationException is thrown. If object does not already have a Principal extension, one is automatically created by this property.

Group Class
 Overview
 Public and Protected Interface
 partial public class Group: System.Storage.Core.Contact

```
{
    public Group( IdentityClaim id);
    // Methods
    static public Group FindByIdentity(System.Type type,
    string urnValue);
    static public Group FindByIdentity(IdentityReference id);
    static public Group FindByIdentity(string emailUrnValue);
    public new override String ToString( );
    public bool IsEqual( );
    public overload operator==(Group p1, Group p2);
    public FindResult GetMembers( ); // one level
    public FindResult GetMembers(System.Type type);
    public FindResult GetAllMembers(int level);
    public FindResult GetAllMembers(System.Type type,
    int Level);
    public void AddMember(Contact contact);
    public void AddMember(System.Type type, string urnValue);
    public void AddMember(IdentityReference id);
    public void AddMember(urnValue);
    public void RemoveMember(Contact contact);
    public void RemoveMember(System.Type type, string urnValue);
    public void RemoveMember(IdentityReference id);
    public void RemoveMember(urnValue);
    //MemberOf
    public FindResult GetGroupMemberOf( );
    public FindResult GetGroupMemberOf(System.Type type);
        //note: type could be typeOf(Group) or
        typeOf(IdentityReference)
}
```

Properties and Methods static public Group FindByIdentity(ItemContext itemContext, System.Type type, string urnValue)

See the Fundamental Principal API Properties and Methods discussion.

static public Group FindByIdentity(ItemContext itemContext, IdentityReference id)

See the Fundamental Principal API Properties and Methods discussion.

static public Group FindByIdentity(ItemContext itemContext, string urnValue)

See the Fundamental Principal API Properties and Methods discussion.

public new override String ToString( )

Returns the display name for the Group.

public bool IsEqual(Group p1)

The Principal extensions of each group are compared to each other (return this.Principal==p1.Principal).

public overload operator==(Group p1, Group p2)
If both p1 and p2 are NULL then TRUE is returned. If one is null, but other is non-null, false is returned. Otherwise p1.IsEqual(p2) is returned.

public FindResult GetMembers( )
GetMembers uses a RelationshipSearcher<Contact, MemberOfGroups> to find all the Contact (or objects derived from Contact) objects who are immediate members of this Group. This Group is specified as the Source of the relationship. The Targets of the returned Relationships are put in a FindResult collection and returned to the caller.

public FindResult GetMembers(System.Type type)
GetMembers uses a RelationshipSearcher<type, MemberOfGroups> to retrieve all the items of the specified type that have a MemberOfGroups relationship with this Group. This Group is specified as the Source of the relationship. The Targets of the returned Relationships are put in a FindResult collection and returned to the caller.

public FindResult GetAllMembers(int level)
Three FindResult collections are created: FinalResults, CurrentLevel and CurrentResults.
GetMembers is called and the results are added to the CurrentLevel collection.
While level doesn't equal 0, each item in the CurrentLevel collection has GetMembers called on it. The results from each call are added to the CurrentResults collection. Once all the items in the CurrentLevel collection have been traversed, level is decremented and all the items in the CurrentLevel are moved into the FinalResults collection. All the items from the CurrentResults collection are moved into the CurrentLevel collection. Then back to the start of this paragraph. If there are no items in the CurrentResults collection or level equals 0 then the cycle is broken and we move on.
The FinalResults collection is returned to the caller.

public FindResult GetAllMembers(System.Type type, int Level)
Three FindResult collections are created: FinalResults, CurrentLevel and CurrentResults.
GetMembers(type) is called and the results are added to the CurrentLevel collection.
While level doesn't equal 0, each item in the CurrentLevel collection has GetMembers(type) called on it. The results from each call are added to the CurrentResults collection. Once all the items in the CurrentLevel collection have been traversed, level is decremented and all the items in the CurrentLevel are moved into the FinalResults collection. All the items from the CurrentResults collection are moved into the CurrentLevel collection. Then back to the start of this paragraph. If there are no items in the CurrentResults collection or level equals 0 then the cycle is broken and we move on.
The FinalResults collection is returned to the caller.

public void AddMember(Contact contact)
AddMember creates a MemberOfGroups relationship between this group and the Principal extension of the specified contact. If the specified contact already is a member of this group then a SystemException is thrown.

public void AddMember(System.Type type, string urnValue)
AddMember performs a search for an item that has an IdentityClaim that matches the type and urnValue passed in. If an item is returned then a MemberOfGroups relationship is created between that item and this group. If the search fails the exception thrown by the search is propagated to the caller. If the item is already a member of the group, then an InvalidOperationException is thrown.

public void AddMember(IdentityReference id)
AddMember performs a search for an item that has an IdentityClaim that matches the IdentityReference passed in. If an item is returned then a MemberOfGroups relationship is created between that item and this group. If the search fails the exception thrown by the search is propagated to the caller. If the item is already a member of the group, then an InvalidOperationException is thrown.

public void AddMember(urnValue)
AddMember performs a search for an item that has an IdentityClaim that matches the urnValue passed in. If an item is returned then a MemberOfGroups relationship is created between that item and this group. If the search fails the exception thrown by the search is propagated to the caller.

public void RemoveMember(Contact contact)
RemoveMember deletes the membership relationship between this group and the specified Contact. If no MemberOfGroups relationship exists then a NoRelationshipExists exception is thrown.

public void RemoveMember(System.Type type, string urnValue)
RemoveMember performs a search for an item that has an IdentityClaim that matches the type and urnValue passed in. If an item is returned then the MemberOfGroups relationship between this group and the item is deleted. If no MemberOfGroups relationship exists then a NoRelationshipExists exception is thrown. If the search fails the exception thrown by the search is propagated to the caller.

public void RemoveMember(IdentityReference id)
RemoveMember performs a search for an item that has an IdentityClaim that matches the IdentityReference passed in. If an item is returned then the MemberOfGroups relationship between this group and the item is deleted. If no MemberOfGroups relationship exists then a NoRelationshipExists exception is thrown. If the search fails the exception thrown by the search is propagated to the caller.

public v id RemoveMember(urnValue)
RemoveMember performs a search for an item that has an IdentityClaim that matches the urnValue passed in. If an item is returned then the membership relationship between this group and the item is deleted. If no membership relationship exists then a NoRelationshipExists exception is thrown. If the search fails the exception thrown by the search is propagated to the caller.

public FindResult GetGroupMemberOf( )
GetGroupMemberOf returns the set of Groups that this group has MemberOfGroups relationships with, where this group is the target of the relationship. (i.e. the set of groups that this group is a member of) This only returns Groups that this group has a direct relationship with.
The search is performed using a RelationshipSearcher<Group, MemberOfGroups> with this Group as the target of the Relationship. The Sources of the Relationships returned are added to a FindResult collection and returned to the caller.

public FindResult GetGroupMemberOf(System.Type type)
GetGroupMemberOf returns the set of items of the specified type that this group has MemberOfGroups relationships with, where this group is the target of the relationship. (i.e.

the set of groups that this group is a member of) This only returns items of the specified type that this group has a direct relationship with.

The type parameter dictates what type of item is returned. If the type is Group then this method has the same functionality as the public FindResult GetGroupMemberOf( ) method. If a specific type of IdentityReference is specified then the IdentityReferences of that type are returned for each group that supports them.

The search is performed using a RelationshipSearcher<Group, MemberOfGroups> with this Group as the target of the Relationship. The Sources of the Relationships returned are added to a FindResult collection and returned to the caller.

Household Class
  Overview
  The Household class is used to define a household.
  Public and Protected Interface
    partial public class Household: System.Storage.Core.Contact

```
{
    public Household( IdentityClaim id);
    // Methods
    static public Household FindByIdentity(System.Type type,
        string urnValue);
    static public Household FindByIdentity(IdentityReference id);
    static public Household FindByIdentity(string emailUrnValue);
    static public Household GetCurrent( ); // i.e My Household
    static public Household GetCurrent(ItemContext ctx);
    public new override String ToString( );
    public bool IsEqual( );
    public overload operator==(Household p1, Household p2);
    //Household Member
    public FindResult GetMembers( );
    public FindResult GetMembers(System.Type type);
    // i.e Identity Reference
    public voic AddMember(Person person);
    public void AddMember(System.Type type, string urnValue);
    public void AddMember(IdentityReference id);
    public void AddMember(urnValue);
    public void RemoveMember(Person person);
    public void RemoveMember(System.Type type, string urnValue);
    public void RemoveMember(IdentityReference id);
    public void RemoveMember(urnValue);
}
```

Properties and Methods static public Household FindByIdentity(ItemContext itemContext, System.Type type, string urnValue)
  See the Fundamental Principal API Properties and Methods discussion.

static public Household FindByIdentity(ItemContext itemContext, IdentityReference id)
  See the Fundamental Principal API Properties and Methods discussion.

static public Household FindByIdentity(ItemContext itemContext, string urnValue)
  See the Fundamental Principal API Properties and Methods discussion.

public new override String ToString( )
  See the Fundamental Principal API Properties and Methods discussion.

public bool IsEqual(Household p1)
  The Principal extensions of each Household are compared to each other (return this.Principal==p1.Principal).

public overload operator==(Household p1, Household p2)
  If both p1 and p2 are NULL then TRUE is returned. If one is null, but other is non-null, false is Otherwise p1.IsEqual (p2) is returned.

public FindResult GetMembers( )
  GetMembers uses a RelationshipSearcher<Contact, MemberOfHousehold> to find all the Contact (or objects derived from Contact) objects who are immediate members of this Household. This Household is specified as the Source of the relationship. The Targets of the returned Relationships are put in a FindResult collection and returned to the caller.

public FindResult GetMembers(System.Type type)
  GetMembers uses a RelationshipSearcher<type, MemberOfHousehold> to find all the items of the specified type who are immediate members of this Household. This Household is specified as the Source of the relationship. The Targets of the returned Relationships are put in a FindResult collection and returned to the caller.

public void AddMember(Person person)
  AddMember creates a membership relationship between this Household and the specified person. If the specified person already is a member of this Household then a InvalidArgumentException is thrown.

public void AddMember(System.Type type, string urnValue)
  AddMember performs a search for an item that has an IdentityClaim that matches the type and urnValue passed in. If an item is returned then a membership relationship is created between that item and this household. If the search fails, the exception thrown is propagated to the caller. If there is already a membership relationship between this Household and the returned item, then a InvalidArgumentException is thrown.

public void AddMember(IdentityReference id)
  AddMember performs a search for an item that has an IdentityClaim that matches the IdentityReference passed in. If an item is returned then a membership relationship is created between that item and this household. If the search fails, the exception thrown is propagated to the caller. If there is already a membership relationship between this Household and the returned item, then a InvalidArgumentException is thrown.

public void AddMember(urnValue)
  AddMember performs a search for an item that has an IdentityClaim that matches the urnValue passed in. If an item is returned then a membership relationship is created between that item and this household. If the search fails, the exception thrown is propagated to the caller. If there is already a membership relationship between this Household and the returned item, then an InvalidArgumentException is thrown.

public void RemoveMember(Person person)
  RemoveMember deletes the membership relationship between this Household and the specified Person. If no membership relationship exists then a NoRelationshipExists exception is thrown.

public void RemoveMember(System.Type type, string urnValue)
  RemoveMember performs a search for an item that has an IdentityClaim that matches the type and urnValue passed in. If an item is returned then the membership relationship between this Household and the item is deleted. If no membership relationship exists then a NoRelationshipExists exception is thrown.

public void RemoveMember(IdentityReference id)

RemoveMember performs a search for an item that has an IdentityClaim that matches the IdentityReference passed in. If an item is returned then the membership relationship between this Household and the item is deleted. If no membership relationship exists then a NoRelationshipExists exception is thrown.

public void RemoveMember(urnValue)

RemoveMember performs a search for an item that has an IdentityClaim that matches the urnValue passed in. If an item is returned then the membership relationship between this Household and the item is deleted. If no membership relationship exists then a NoRelationshipExists exception is thrown.

Organization Class
  Overview
  Public and Protected Interface
  partial public class Organization: System.Storage.Core.Contact

```
{
    public Organization( IdentityClaim id);
    // Methods
    static public Organization FindByIdentity(System.Type type,
    string urnValue);
    static public Organization FindByIdentity(IdentityReference id);
    static public Organization FindByIdentity(string emailUrnValue);
    static public Organization GetCurrent( ); // i.e My Organization
    static public Organization GetCurrent(ItemContext ctx);
    public new override String ToString( );
    public bool IsEqual(Organization p1);
    public overload operator==(Organization p1, Organization p2);
    //Organization Employees
    public FindResult GetEmployees( ); // each item is Person
    public FindResult GetEmployees(System.Type type);
    // i.e Identity Reference
    public voic AddEmployee(Person person);
    public void AddEmployee(System.Type type, string urnValue);
    public void AddEmployee(IdentityReference id);
    public void AddEmployee(urnValue);
    public void RemoveEmployee(Person person);
    public void RemoveEmployee(System.Type type, string urnValue);
    public void RemoveEmployee(IdentityReference id);
    public void RemoveEmployee(urnValue);
    public Organization GetParentOrganization( );
}
```

Properties and Methods static public Organization FindByIdentity(ItemContext itemContext, System.Type type, string urnValue)
  See the Fundamental Principal API Properties and Methods discussion.

static public Organization FindByIdentity(ItemContext itemContext, IdentityReference id)
  See the Fundamental Principal API Properties and Methods discussion.

static public Organization FindByIdentity(ItemContext itemContext, string urnValue)
  See the Fundamental Principal API Properties and Methods discussion.

static public Organization GetCurrent( )
  See the Fundamental Principal API Properties and Methods discussion.

static public Organization GetCurrent(ItemContext ctx)
  See the Fundamental Principal API Properties and Methods discussion.

public new override String ToString( )
  Returns the display name for the organization.

public bool IsEqual(Organization p1)
  The Principal extensions of each Organization are compared to each other (return this.Principal==p1.Principal).

public overload operator==(Organization p1, Organization p2)
  If both p1 and p2 are NULL then TRUE is returned. If one is null, but other is non-null, false is returned. Otherwise p1.IsEqual(p2) is returned.

public FindResult GetEmployees( )
  GetMembers uses a RelationshipSearcher<Person, EmployeeOf> to find all the Person objects who are immediate members of this Organization. This Organization is specified as the Source of the relationship. The Targets of the returned Relationships are put in a FindResult collection and returned to the caller.

public FindResult GetEmployees(System.Type type)
  GetMembers uses a RelationshipSearcher<type, EmployeeOf> to find all the items of the specified type who are immediate members of this Organization. This Organization is specified as the Source of the relationship. The Targets of the returned Relationships are put in a FindResult collection and returned to the caller.

public void AddEmployee(Person person)
  AddEmployee creates an EmployeeOfrelationship between this Organization and the specified Person. If the specified Person already is a member of this Organization then a InvalidArgumentException is thrown.

public void AddEmployee(System.Type type, string urnValue)
  AddEmployee performs a search for an item that has an IdentityClaim that matches the type and urnValue passed in. If a Person is returned then a membership relationship is created between that Person and this Organization. If the search fails, the exception thrown is propagated to the caller. If there is already a membership relationship between this Organization and the returned Person, then a InvalidArgumentException is thrown.

public void AddEmployee(IdentityReference id)
  AddEmployee performs a search for an item that has an IdentityClaim that matches the IdentityReference passed in. If a Person is returned then an Employeeof relationship is created between that Person and this Organization. If the search fails, the exception thrown is propagated to the caller. If there is already a membership relationship between this Organization and the returned Person, then a InvalidArgumentException is thrown.

public void AddEmployee(urnValue)
  AddEmployee performs a search for an item that has an IdentityClaim that matches the urnValue passed in. If an item is returned then an EmployeeOf relationship is created between that Person and this Organization. If the search fails, the exception thrown is propagated to the caller. If there is already a EmployeeOf relationship between this Organization and the returned Person, then a InvaidArgumentException is thrown.

public void RemoveEmployee(Person person)

RemoveEmployee deletes the membership relationship between this Organization and the specified Person. If no EmployeeOf relationship exists then a NoRelationshipExists exception is thrown.

public void RemoveEmployee(System.Type type, string urnValue)

RemoveEmployee performs a search for an item that has an IdentityClaim that matches the type and urnValue passed in. If a Person is returned then the EmployeeOf relationship between this Organization and the Person is deleted. If no EmployeeOf relationship exists then a NoRelationshipExists exception is thrown.

public void RemoveEmployee(IdentityReference id)

RemoveEmployee performs a search for an item that has an IdentityClaim that matches the IdentityReference passed in. If a Person is returned then the EmployeeOf relationship between this Organization and the Person is deleted. If no Employeeof relationship exists then a NoRelationshipExists exception is thrown.

public void RemoveEmployee(urnValue)

RemoveEmployee performs a search for an item that has an IdentityClaim that matches the urnValue passed in. If a Person is returned then the Employeeof relationship between this Organization and the Person is deleted. If no Employeeof relationship exists then a NoRelationshipExists exception is thrown.

public Organization GetParentOrganization( )

GetParentOrganization returns the item identified by the m_ParentOrganization member by using the ItemIDReference.Resolve method to convert the ID into an item.

IdentityClaim Class

Overview

The IdentityClaim class is used to assert that a specific identifier (SID or email address etc.) is authoritatively associated with a specific Principal. Once created an IdentityClaim cannot be modified (except perhaps the start and end dates).

Schema

IdentityClaim has the following persistent properties:

UrnScheme—String
UrnValue—String
DisplayName—String
AssociatedUrl—String
StartDate—Date
EndDate—Date
Signature—Byte Array Classes derived from IdentityClaim do not add persistent properties to their class definitions.

Public and Protected Interface partial public abstract class IdentityClaim: System.Storage.Storage.NestedElement

```
{
    public static bool operator==(
        IdentityClaim left,
        IdentityClaim right )
    public static bool operator!=(
        IdentityReference left,
        IdentityReference right )
    IdentityReference GetIdentityReference( );
    IdentityClaim Translate(System.Type type);
}
```

Properties and Methods operator==

The equivalence operator returns TRUE if the IdentityClaims passed in are equivalent. This is determined by comparing each of the internal fields for the IdentityClaim.

operator!=

The 'not equivalent' operator returns TRUE if the equivalence operator would return FALSE and vice-versa.

GetIdentityReference

GetIdentityReference returns a new identity reference for this IdentityClaim. The reference date for the new identity reference is set to now (the current date and time). The other appropriate data (urnScheme, urnValue) is copied from this IdentityClaim.

IdentityClaim Translate(System.Type type)

Translate translates an IdentityClaim to an IdentityClaim of a different type that still refers to the same item. For instance if a caller has a SID, then an SecuityIdentityClaim can be created for that SID and then Translate can be called to generate a NT4AccountIdentityClaim that is associated with that SID.

Translate performs a search for an item associated with the given IdentityClaim. If an item is found then a search is performed for an IdentityClaim of the requested type that is associated with the returned item.

The search is performed using Principal.FindByIdentity (type, this). If a Principal is returned, it's IdentityClaims are enumerated, looking for one with the right UrnScheme property. If a matching IdentityClaim is found, that IdentityClaim is returned to the caller. If no Principal is returned, a SystemException is thrown. If the search fails, the exception thrown is propagated to the caller.

Figure 5:
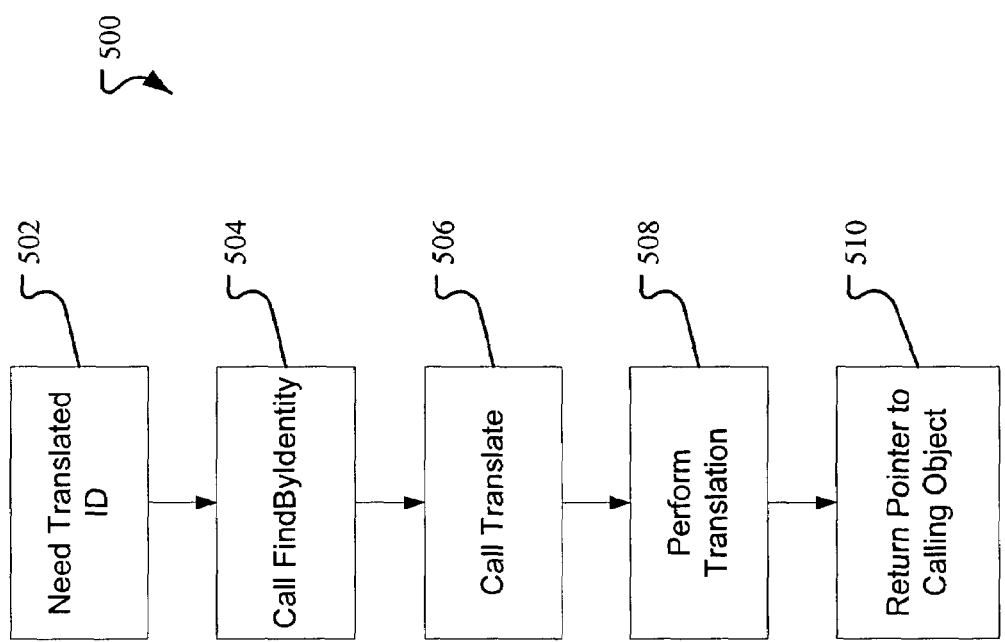
FIG. 5 illustrates an embodiment of a translate method of a Principal API in accordance with the present invention.

FIG. 5 illustrates an embodiment of the translate method in accordance with the present invention. In FIG. 5, an object having an identity reference needs 502 to translate that identity reference into a different form. For example, the object has a SID as an identity reference but needs a GUID for the same principle.

The object first performs a findbyidentity operation 504 that identifies the principal and instantiates the principal object, and thus the principal's identity claim object by calling a findbyidentity method as described above. The operation returns a pointer to the instantiated principal object.

Next, a call translate method operation 506 calls (invokes) the IdentityClaim Translate method of the identity claim object. As part of the call, the calling object passes the type of identity reference as an argument of the call that the calling object needs for the principal. In the example above, the type corresponding to GUID is passed.

Calling the translate method results in a translation operation 508, in which the translate method of the identity claim object searches the other identity claim objects of the principal for one with the same type as that passed in the argument. If an identity claim of that type is found, then a pointer to that identity claim is returned to the calling object in a return pointer operation 510. Thus the calling object now has access to the "translated" identity reference.

IdentityReference Class
  Overview
  An IdentityReference refers to an instance of an IdentityClaim class. Programmatically, IdentityReferences are used to define a relationship between two identities, for example adding a Person to a Group, or searching for IdentityClaims.

The IdentityReference is a WinFS class and other identity specific classes are derived from IdentityReference. Once an IdentityReference (or a class derived from IdentityReference) is constructed, it is immutable, that is: it cannot change over its lifetime.

Schema
  IdentityReference has the following persistent properties:
  Urnscheme—String
  UrnValue—String
  ReferenceDate—Date
  Classes derived from IdentityReference do not add persistent properties to their class definitions.
  Public and Protected Interface
  partial public abstract class IdentityReference: System.Storage.Storage.Root

```
{
    //Constructor
    no constructor, this is an abstract class
    // Methods
    static public IdentityReference GetCurrent( );
    // i.e My IdentityReference
    static public IdentityReference GetCurrent(ItemContext ctx);
    public new override String ToString( );
    public bool IsEqual( );
    public overload operator==(IdentityReference p1,
    IdentityReference p2);
    public IdentityReference Translate( System.Type type);
    public IdentityReferenceCollection
    ResolveAmbigousName(ItemContext itemContext, string
urnValue);
    public IdentityClaim GetIdentityClaim( );
}
```

Properties and Methods static public IdentityReference GetCurrent( )
  GetCurrent returns an IdentityReference for the current users' security context.
  This is done by calling OpenThreadToken and using the returned token in a call to GetTokenInformation requesting TokenUser, which returns a SID. A SecurityIdentity is then initialized with the SID and returned to the caller.

public new String ToString( )
  Each class derived from IdentityReference implements ToString to return a string representation of that type of IdentityReference. The format of the string is dictated by the type of IdentityReference.

public bool IsEqual(IdentityReference p1)
  Return TRUE if the UrnScheme and UrnValue members are the same.

public overload operator==(IdentityReference p1, IdentityReference p2)
  Return p1.IsEqual(p2).

public IdentityReference Translate(System.Type type)
  Translate translates an IdentityReference to an IdentityReference of a different type that still refers to the same item. For instance if a caller has a SID, then an SecurityIdentity can be created for that SID and then Translate can be called to generate a NT4AccountIdentity that is associated with that SID.

Translate performs a search for an item associated with the given IdentityReference. If an item is found then a search is performed for an IdentityReference of the requested type that is associated with the returned item.

The search is performed using Principal.FindByIdentity (type, this). If a Principal is returned, it's IdentityClaims are enumerated, looking for one with the right urnScheme property. If a matching IdentityClaim is found, IdentityClaim.GetIdentityReference is called and the resulting IdentityReference is returned to the caller. If no Principal is returned, a SystemException is thrown. If the search fails, the exception thrown is propagated to the caller.

public IdentityReferenceCollection ResolveAmbigousName(ItemContext itemContext, string value)
  ResolveAmbiguousName returns a collection of IdentityReferences that match the value argument. The search is performed on the ItemContext using the Find method that takes a filter and a type. The method searches all Contact related classes which has value specified that matches with property value of Given Name or Suname, or TelephoneNumber, or Office, or DisplayName.
  The items returned are placed in an IdentityReferenceCollection and returned to the caller.

public IdentityClaim GetIdentityClaim( )
  If this IdentityReference is not associated with an item (via a Principal) then an InvalidOperationException is thrown. Otherwise all the searches are performed against the ItemContext f the Item that this IdentityReference is associated with.

GetIdentityClaim returns the identity claim that this IdentityReference refers to. It does this by performing a search for IdentityClaims that match the urnValue and urnScheme of the IdentityReference. The referenceDate of the IdentityReference must also fall between the StateDate and EndDate members of the IdentityClaim.

The search is performed using ItemContext.Find(type, filter) where type is IdentityClaim and the filter is of the form 'm_urnScheme=urnScheme AND m_urnValue=urnValue AND (IsNull(m_startDate) OR m_startDate<referenceDate) AND (IsNull(m_endDate) OR m_endDate> referenceDate)' where urnScheme, urnValue and referenceDate are members of this IdentityReference.

IdentityReferenceCollection Class
  Overview
  The IdentityReferenceCollection is simply a collection that holds IdentityReferences. It can also be used to translate a number of IdentityReference objects in one method call.
  Public and Protected Interface
  public class IdentityReferenceCollection: Implement IEnumerable, IList

```
{
    public void Add(System.Type type, String urnValue);
    public void Add(IdentityReference ref);
    public void Remove(IdentityReference ref);
    public void Remove(SystemType type, String urnValue);
    IdentityReferenceCollection Translate(SystemType type);
}
```

Properties and Methods public void Add(System.Type type, String urnValue)
Add inserts an IdentityReference, constructed from the type and urnValue passed in, into this Collection.

public void Add(IdentityReference ref)
Add inserts the given IdentityReference into the Collection.

public void Remove(IdentityReference ref)
Remove searches the collection for any IdentityReferences that match the given IdentityReference and removes them. (NOTE: If multiple IdentityReferences exist in the Collection that match the given one, only the first occurrence will be removed.) If no matching IdentityReference exists in the collection, no exception will be thrown and the collection will not be modified.

public void Remove(SystemType type, String urnValue)
Remove searches the collection for any IdentityReferences that match the given type and urnValue and removes them. (NOTE: If multiple IdentityReferences exist in the Collection that match the specified parameters, only the first occurrence will be removed.) If no matching IdentityReference exists in the collection, the collection will not be modified and no exception will be thrown.

IdentityReferenceCollection Translate(SystemType type)
Translate translates all the IdentityReferences in the collection to the specified type. See IdentityReference.Translate for more details. Any item in the collection that cannot be translated is copied into the returned collection. The order of the items in the returned collection is the same as the original collection.

IdentityClaimCollection Class
Overview
The IdentityClaimCollection is simply a collection that holds IdentityClaims.
Public and Protected Interface
public class IdentityClaimCollection: Implement IEnumerable, IList

```
{
    public void Add(System.Type type, String urnValue);
    public void Add(IdentityClaim claim);
    public void Remove(IdentityClaim claim);
    public void Remove(SystemType type, String urnValue);
    IdentityClaimCollection Translate( );
}
```

Properties and Methods public void Add(System.Type type, String urnValue)
Add inserts an IdentityClaim, constructed from the type and urnValue passed in, into this Collection.

public void Add(IdentityClaim claim)
Add inserts the given IdentityClaim into the Collection.

public void Remove(IdentityClaim claim)
Remove searches the collection for any IdentityClaims that match the given IdentityClaim and removes them. (NOTE: If multiple IdentityClaims exist in the Collection that match the given one, they will all be removed.)

public void Remove(SystemType type, String urnValue)
Remove searches the collection for any IdentityClaims that match the given type and urnValue and removes them. (NOTE: If multiple IdentityClaims exist in the Collection that match the specified parameters, they will all be removed.)

IdentityClaimCollection Translate(SystemType type)
Translate translates all the IdentityClaims in the collection to the specified type. See IdentityClaim.Translate for more details. Any item in the collection that cannot be translated is copied into the returned collection. The order of the items in the returned collection is the same as the original collection.

GuidIdentity Class
Overview
The GuidIdentity class encapsulates a GUID.
Public and Protected Interface
public class GuidIdentity: IdentityReference

```
{
    //constructors
    public GuidIdentity( );
    public GuidIdentity(string guidUrnValue); // string hex
    public GuidIdentity(Guid g);
        // Properties
    public UrnString{ get; }
    // Methods
    public string override ToString( );
    public Guid ToGuid( );
}
```

Properties and Methods public GuidIdentity( )
The default constructor initializes the internal GUID to GUID_NULL. The GUID_NULL should be the GUID consisting entirely of 0s. For example "{00000000-0000-0000-0000-000000000000}"
The referenceDate member is set to the current time and date.

public GuidIdentity(string guidUrnValue)
If a string of the format '{XXXXXXXX-XXXX-XXXX-XXXX-XXXXXXXXXXXX}' (where Xs denotes hexadecimal characters) is passed in then the internal GUID is initialized to the GUID described by the string. Otherwise an InvalidArgument exception is thrown.
The referenceDate member is set to the current time and date.

public GuidIdentity(Guid g)
The internal GUID is initialized to the specified GUID (g).
The referenceDate member is set to the current time and date.

public UrnScheme {get;}
The UrnScheme property returns the literal string 'guid'.

ToString
ToString returns a string representation of the GUID contained in the GuidIdentityClaim. The string is of the form '{XXXXXXXX-XXXX-XXXX-XXXX-XXXXXXXXXXXX}' (where Xs denotes hexadecimal characters).

ToGuid
ToGuid returns a Guid containing the GUID contained in the GuidIdentityClaim.

SecurityIdentity Class
  OverView
    The SecurityIdentity class encapsulates the (Security IDentifier) SID structure.
  Public and Protected Interface
    public class SecurityIdentity: IdentityReference

```
{
    // Constructors
    public SecurityIdentity( );
    public SecurityIdentity(string stringUrnValue)
  public string UrnScheme { get; }
    public string override ToString( );
    public int CompareTo( object o )
    public static bool IsEqualDomainSid( SecurityIdentifier sid1,
        SecurityIdentifier sid2 )
    internal int GetSubAuthority( int index )
    public bool IsWellKnown( WellKnownSidType type )
    public void GetBinaryForm( byte[ ] existingArray )
    public void GetBinaryForm(byte[ ] existingArray, int offset )
}
```

Properties and Methods public string UrnScheme {get;}
  The UrnScheme property returns the literal string 'ms-sid'.

public string ToString( )
  ToString returns a string representation of the SID contained in the SecurityIdentity.

CompareTo
  This compares SIDs.

public static bool IsEqualDomainSid(SecurityIdentity sid1, SecurityIdentifier sid2)
  IsEqualDomainSid compares the domain portion of two SIDs and returns TRUE if they are he same.

internal int GetSubAuthority(int index)
  Returns the sub-authority part of the SID.

public bool IsWellKnown(WellKnownSidType type)
  IsWellKnown returns TRUE if the SID contained in the SecurityIdentity is of the type passed in as the type argument. Otherwise FALSE is returned.

public void GetBinaryForm(byte existingArray)
  Returns a SID structure for use in Win32 function calls.

public void GetBinaryForm(byte existingArray, int offset)
  Returns a SID structure for use in Win32 function calls. The SID will be placed into the byte array, starting at the given offset.

NT4AccountIdentity Class
  Overview
    The NT4AccountIdentity holds a reference to an NT4 account name.
  Public and Protected Interface
    public class NT4AccountIdentity: IdentityReference

```
{
    public string UrnScheme { get; }
    public string override ToString( );
    public string DomainName {get; }
    public string AccountName { get; }
}
```

Properties and Methods public string UrnScheme {get;}
  The UrnScheme property returns the literal string 'ms-nt4account'.

public string override ToString( )
  ToString returns a string representation of the NT 4 account contained in the NT4AccountIdentity. It is of the form '\\DOMAIN\USERNAME'.

public string DomainName {get;}
  DomainName cracks (by parsing the string, looking for the appropriate delimiters) the NT 4 account contained in the NT4AccountIdentity and returns the domain part. (It just returns the domain name and does not include any decoration around the name.)

public string AccountName {get;}
  AccountName cracks (by parsing the string, looking for the appropriate delimiters) the NT 4 account contained in the NT4AccountIdentity and returns the account name part. (It just returns the account name and does not include any decoration around the name.)

LdapDnIdentity Class
  Overview
    The LdapDnIdentity class holds an LDAP Distinguished Name.
  Public and Protected Interface
    public class LdapDuIdentity: IdentityReference

```
{
    public string UrnScheme { get; };
    public string override ToString( );
}
```

Properties and Methods public string UrnScheme {get;}
  The UrnScheme property returns the literal string 'ms-ldapdn'.

public string override ToString( )
  ToString returns a string representation of the DN contained in the LdapDnIdentityClaim. It is of the form LDAP Distinguished Name, for example 'CN=dc-01, DC=fabrikam,DC=com'.

CreditCardIdentity Class
  Overview
    The CreditCardIdentityClaim class holds credit card details.
  Public and Protected Interface
    public class CreditCardIdentity: IdentityReference

```
{
    public string UrnScheme { get; }
    public string override ToString( );
}
```

Properties and Methods public string UrnScheme {get;}
  The UrnScheme property returns the literal string 'creditcard'.

public string override ToString( )
  ToString returns UrnScheme.

TransitIdentity Class
Overview
A TransitIdentity contains a transit or routing number for a bank.
Public and Protected Inteface
public class TransitIdentity: IdentityReference

```
{
    public string UrnScheme { get; }
    public string override ToString( );
}
```

Properties and Methods public string UrnScheme {get;}
The UrnScheme property returns the literal string 'ms-transit'.

public string override ToString( )
ToString returns UrnScheme.

UpnId ntity Class
Overview
The UpnIdentityClaim class holds a Universal Principal Name (UPN).
Public and Protected Interface
public class UpnIdentity: IdentityReference

```
{
    public string UrnScheme { get; }
    public string override ToString( );
}
```

Properties and Methods public string UrnScheme {get;}
The UrnScheme property returns the literal string 'upn'.

public string override ToString( )
ToString returns a string representation of the UPN contained in the UpnIdentityClaim. It is of the form of User Principal Name (UPN), for example: 'name@fabrikam.com'.

LicenseIdentity Class
Overview
The LicenseIdentity class holds drivers license details.
Public and Protected Interface
public class LicenseIdentity: IdentityReference

```
{
    public string UrnScheme { get; }
    public string override ToString( );
}
```

Properties and Methods public string UrnScheme {get;}
The UrnScheme property returns the literal string 'license'.

public string override ToString( )
ToString returns UrnScheme.

P2PIdentity Class
Overview
The P2PIdentity class holds P2P identities and details. P2P stands for "peer-to-peer".
Public and Protected Interface
public class P2PIdentity: IdentityReference

```
{
    public string UrnScheme { get; }
    public string override ToString( );
}
```

Properties and Methods public string UrnScheme {get;}
The UrnScheme property returns the literal string 'p2p'.

public string override ToString( )
ToString returns UrnScheme.

SsnIdentityClaim
Overview
The SsnIdentityClaim class holds a Social Security Number (SSN).
Public and Protected Interface
public class SsnIdentityClaim: IdentityClaim

```
{
    public string UrnScheme { get; }
    public string override ToString( );
}
```

Properties and Methods public string UrnScheme {get;}
The UrnScheme property returns the literal string 'ssn'.

public string override ToString( )
ToString returns UrnScheme.

GuidIdentityClaim Class
Overview
The GuidIdentityClaim class encapsulates a GUID.
Public and Protected Interface
public class GuidIdentityClaim: IdentityClaim

```
{
    public string UrnScheme { get; }
    public string override ToString( );
    public Guid ToGuid( );
}
```

Properties and Methods public string UrnValue {get;}
The UrnScheme property returns the literal string 'ms-guid'.

public string override ToString( )
ToString returns a string representation of the GUID contained in the GuidIdentityClaim. The string is of the form '{XXXXXXXX-XXXX-XXXX-XXXX-XXXXXXXXXXXX}'.

public Guid ToGuid( )
ToGuid returns a Guid containing the GUID contained in the GuidIdentityClaim.

CreditCardIdentityClaim Class
Overview

The CreditCardIdentityClaim class holds credit card details.
Public and Protected Interface
public class CreditCardIdentityClaim: IdentityClaim

```
{
    public string UrnScheme { get; }
    public string override ToString( );
}
```

Properties and Methods public string UrnScheme {get;}
The UrnScheme property returns the literal string 'creditcard'.

public string override ToString( )
ToString returns UrnScheme.

TransitIdentityClaim Class
Overview
A TransitIdentityClaim holds a transit or routing number for a bank.
Public and Protected Interface

```
{
    public string UrnScheme { get; }
    public string override ToString( );
}
```

Properties and Methods public string UrnScheme {get;}
The UrnScheme property returns the literal string 'ms-transit'.

public string override ToString( )
ToString returns UrnScheme.

UpnIdntityClaim Class
Overview
The UpnIdentityClaim class holds a Universal Principal Name (UPN).
Public and Protected Interface
public class UpnIdentityClaim: IdentityClaim

```
{
    public string UrnScheme { get; }
    public string override ToString( );
}
```

Properties and Methods public string UrnScheme {get;}
The UrnScheme property returns the literal string 'upn'.

public string override ToString( )
ToString returns a string representation of the UPN contained in the UpnIdentityClaim. It is of the form 'name@fabrikam.com'.

AccountInformation Class
Overview
The AccountInformationClass is an embedded member of the Principal class and stores account information for the Principal, such as logon credentials etc.

Public and Protected Interface
partial public class AccountInformation: System.Storage.Principal.SignedNestedElement

```
{
    public void SetLogonHour( System.DayOfWeek, int startHour,
        int endHour,
            LogonHour.Access);
    public void SetLogonHour( System.DayOfWeek, int startHour,
        int minutes,
            int endHour, int minutes, LogonHour.Access);
    public void SetLogonHour( System.DayOfWeek,
        LogonHour.Access);
}
```

Properties and Methods

SetLogonHour
SetLogonHour is used to specify when the associated principal is able to logon. Each variation allows for different granularity to the logon period.

Thus, the present invention is presently embodied as a method, apparatus, computer program product or computer readable media encoding a computer program for an API for centralized storage and management of principal data. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method in a computer system for identifying a principal associated with a first object comprising:
   maintaining in the first object identity information identifying the principal;
   invoking a method in an application programming interface (API) with the identity information as an argument, wherein the identity information is an identity reference identifying an identity claim of the principal and invoking comprises:
   invoking a findbyidentity method in a principal API exposed by a principal data store with an ItemContext as a first argument, and the identity reference as a second argument; and
      under control of the findbyidentity method, searching the principal data store identified by the ItemContext argument for the principal having the identity claim;
   instantiating a principal object for the principal having the identity claim;
   returning a pointer to the principal object; and,
   if more than one principal is found in the principal data store, returning an error.

2. The method of claim 1 further comprising:
   storing in the principal data store, principal data including at least one identity claim for every principal known to the computer system.

3. The method of claim 1, wherein the principal object includes at least one identity claim object, and the principal object and identity claim object expose application programming interfaces that have the findbyidentity method.

4. A method in a computer system for identifying a principal associated with a first object comprising:

maintaining in the first object identity information identifying the principal;

invoking a method in an API with the identity information as an argument, wherein the identity information is an identity reference identifying an identity claim of the principal, the identity reference having an identity claim value and scheme, and invoking comprises:

invoking a findbyidentity method with the identity claim value and scheme as arguments;

under control of the findbyidentity method, searching a principal data store for the principal having the identity claim value and scheme;

instantiating a principal object for the principal having the identity claim value and scheme;

returning a pointer to the principal object; and, if more than one principal is found in the principal data store having the identity claim value and scheme, returning an error.

5. The method of claim 4 further comprising:
storing in the principal data store, principal data including at least one identity claim for every principal known to the computer system.

6. The method of claim 4, wherein the principal object includes at least one identity claim object, and the principal object and identity claim object expose application programming interfaces that have the findbyidentity method.

7. A method in a computer system for identifying a principal associated with a first object comprising:
maintaining in the first object identity information identifying the principal;

invoking a method in an application programming interface (API) with the identity information as an argument, wherein the identity information is an identity reference identifying an identity claim of the principal, the identity reference having an identity claim value and scheme, and invoking comprises:

invoking a findbyidentity method with the identity claim value as an argument; and under control of the findbyidentity method, searching a principal data store for the principal having the identity claim value with any scheme;

instantiating a principal object for the principal having the identity claim value and scheme;

returning a pointer to the principal object; and, if more than one principal is found in the data store having the identity claim value and scheme, returning an error.

8. The method of claim 5 further comprising:
storing in the principal data store, principal data including at least one identity claim for every principal known to the computer system.

9. The method of claim 7, wherein the principal object includes at least one identity claim object, and the principal object and identity claim object expose application programming interfaces that have the findbyidentity method.

10. A method in a computer system for identifying a principal associated with a first object comprising:
maintaining in the first object identity information identifying the principal;

invoking a method in an application programming interface (API) with the identity information as an argument, wherein the identity information is an identity reference identifying an identity claim of the principal, the identity reference having an identity claim value and scheme, and invoking comprises:

invoking a findbyidentity method with the identity claim value and scheme and a principal type as arguments, the findbyidentity method in an application programming interface of the first object;

under control of the findbyidentity method, searching a principal data store for a principal of the principal type that also has the identity claim value and scheme;

instantiating a principal object of the principal type, the principal object having the identity claim value and scheme;

returning a pointer to the principal object; and, if more than one principal is found in the data store having the identity claim value and scheme, returning an error.

11. The method of claim 10 further comprising:
storing in the principal data store, principal data including at least one identity claim for every principal known to the computer system.

12. The method of claim 10, wherein the principal object includes at least one identity claim object, and the principal object and identity claim object expose application programming interfaces that have the findbyidentity method.

13. A method in a computer system for identifying a principal associated with a first object comprising:
maintaining in the first object identity information identifying the principal;

invoking a method in an application programming interface (API) with the identity information as an argument, wherein the first object is an identity reference object having an identity reference and invoking comprises:

invoking a findbyidentity method with the identity reference, the findbyidentity method in an application programming interface of the first object; and under control of the findbyidentity method, searching a principal data store for the principal identified by the identity reference;

instantiating a principal object for the principal identified by the identity reference;

returning a pointer to the principal object; and, if more than one principal is found in the data store having the identity claim value and scheme, returning an error.

14. The method of claim 13 further comprising:
storing in the principal data store, principal data including at least one identity claim for every principal known to the computer system.

15. The method of claim 13, wherein the principal object includes at least one identity claim object, and the principal object and identity claim object expose application programming interfaces that have the findbyidentity method.

16. A computer program product readable by a computing system and encoding a computer program of instructions for executing a computer process for identifying a principal, said computer process comprising:
maintaining in a first object identity information identifying the principal;

invoking a method in an application programming interface (API) with the identity information as an argument, under control of the method, wherein the identity information is an identity reference identifying an identity claim of the principal and invoking comprises:

invoking a findbyidentity method in a principal API exposed by a principal data store with the identity reference as a first argument, and an ItemContext as a second argument;

under control of the findbyidentity method, searching the principal data store identified by the ItemContext argument for the principal having the identity claim;

instantiating a principal object for the principal having the identity claim;

returning a pointer to the principal object; and, if more than one principal is found in the data store, returning an error.

17. The computer program product of claim 16 further comprising:

storing in the principal data store, principal data including at least one identity claim for every principal known to the computer system.

18. The computer program product of claim 16, further comprising:

independently selecting a property from the principal data to be an identity claim, the property uniquely identifying the principal and distinguishing it from all other principals known to the computer system.

19. A computer program product readable by a computing system and encoding a computer program of instructions for executing a computer process for identifying a principal, said computer process comprising:

maintaining in a first object identity information identifying the principal;

invoking a method in an application programming interface (API) with the identity information as an argument, wherein the identity information is an identity reference identifying an identity claim of the principal, the identity reference having an identity claim value and scheme, and invoking comprises:

invoking a findbyidentity method with the identity claim value and scheme as arguments;

under control of the findbyidentity method, searching a principal data store for the principal having the identity claim value and scheme;

instantiating a principal object for the principal having the identity claim value and scheme;

returning a pointer to the principal object; and, if more than one principal is found in the data store having the identity claim value and scheme, returning an error.

20. The computer program product of claim 19 further comprising:

storing in the principal data store, principal data including at least one identity claim for every principal known to the computer system.

21. The computer program product of claim 19, further comprising:

independently selecting a property from the principal data to be an identity claim, the property uniquely identifying the principal and distinguishing it from all other principals known to the computer system.

* * * * *

UNITED STATES PATENT AND TRADEMARK OFFICE
CERTIFICATE OF CORRECTION

PATENT NO. : 7,200,608 B2  
APPLICATION NO. : 10/693097  
DATED : April 3, 2007  
INVENTOR(S) : Matthew Rimer et al.

Page 1 of 2

It is certified that error appears in the above-identified patent and that said Letters Patent is hereby corrected as shown below:

In column 1, line 54, delete "y" and insert -- by --, therefor.

In column 1, line 57, delete "f" and insert -- of --, therefor.

In column 1, line 64, delete "SIDS," and insert -- SIDs, --, therefor.

In column 3, line 42, delete "NET" and insert -- .NET --, therefor.

In column 3, line 45, delete "NET" and insert -- .NET --, therefor.

In column 6, line 2, delete "Princiapl" and insert -- Principal --, therefor.

In column 6, line 23, delete "API$_{[AH1]}$." and insert -- API$_{[AH1]}$. --, therefor.

In column 14, line 45, delete "he" and insert -- the --, therefor.

In column 17, line 52, after "p1.Principal" insert -- = --.

In column 22, line 44, delete "v id" and insert -- void --, therefor.

In column 23, line 38, delete "voic" and insert -- void --, therefor.

In column 25, line 40, delete "voic" and insert -- void --, therefor.

In column 26, line 52, delete "Employeeof" and insert -- EmployeeOf --, therefor.

In column 26, line(s) 66–67, delete "InvaidArgumentException" and
insert -- InvalidArgumentException --, therefor.

In column 27, line 21, delete "Employeeof" and insert -- EmployeeOf --, therefor.

In column 27, line 26, delete "Employeeof" and insert -- EmployeeOf --, therefor.

Signed and Sealed this

Twenty-seventh Day of July, 2010

David J. Kappos  
*Director of the United States Patent and Trademark Office*

In column 27, line(s) 27–28, delete "Employeeof" and insert -- EmployeeOf --, therefor.

In column 28, line 27, delete "SecuityIdentityClaim" and insert -- SecurityIdentityClaim --, therefor.

In column 29, line 15, delete "Urnscheme" and insert -- UrnScheme --, therefor.

In column 30, line 33, delete "f" and insert -- of --, therefor.

In column 30, line 56, delete "Implement" and insert -- implement --, therefor.

In column 31, line 40, delete "Implement" and insert -- implement --, therefor.

In column 32, line 37, after "000000000000}"" insert -- . --.

In column 33, line 37, delete "he" and insert -- the --, therefor.

In column 33, line 45, delete "  " and insert -- [ ] --, therefor.

In column 33, line 47, delete "  " and insert -- [ ] --, therefor.

In column 35, line 5, delete "Inteface" and insert -- Interface --, therefor.

In column 35, line 22, delete "UpnId ntity" and insert -- UpnIdentity --, therefor.

In column 36, line 1, delete "P2PIIdentity" and insert -- P2PIdentity --, therefor.

In column 37, line 25, below "Public and Protected Interface"
insert -- public class TransitIdentityClaim: IdentityClaim --.

In column 37, line 41, delete "UpnIdntityClaim" and insert -- UpnIdentityClaim --, therefor.

In column 39, line 48, in Claim 8, delete "claim 5" and insert -- claim 7 --, therefor.